United States Patent [19]
Sato et al.

[11] Patent Number: 5,418,627
[45] Date of Patent: May 23, 1995

[54] SCREEN DOT IMAGE RECORDING METHOD

[75] Inventors: Yasu Sato; Kyonosuke Yamamoto, both of Tokyo, Japan

[73] Assignee: Mitsubishi Paper Mills Limited, Tokyo, Japan

[21] Appl. No.: 942,444

[22] Filed: Sep. 9, 1992

[30] Foreign Application Priority Data

Sep. 9, 1991 [JP] Japan .................................. 3-258543
Sep. 2, 1992 [JP] Japan .................................. 4-234588

[51] Int. Cl.$^6$ ............................................. H04N 1/40
[52] U.S. Cl. ................................... 358/455; 358/456; 358/457
[58] Field of Search .................. 358/455, 75, 78, 287, 358/298, 283, 79, 80, 283, 280, 284, 457, 459, 83, 462, 456, 459

[56] References Cited

U.S. PATENT DOCUMENTS

| | | | |
|---|---|---|---|
| 4,350,996 | 9/1982 | Rosenfeld | 358/75 |
| 4,456,924 | 6/1984 | Rosenfeld | 358/75 |
| 4,499,489 | 2/1985 | Gall et al. | |
| 4,507,685 | 3/1985 | Kawamura | 358/283 |
| 4,700,235 | 10/1987 | Gall | 358/283 |
| 4,712,141 | 12/1987 | Tomohisa et al. | 358/280 |
| 4,811,239 | 3/1989 | Tsao | 358/75 X |
| 4,897,736 | 1/1990 | Sugino | 358/457 |
| 4,985,779 | 1/1991 | Gall | 358/298 |
| 5,016,118 | 5/1991 | Nannichi | 358/462 |
| 5,019,896 | 5/1991 | Shimazaki | 358/75 |
| 5,067,025 | 11/1991 | Kitagawa | 358/298 |
| 5,079,721 | 1/1992 | Gershony | 395/132 |
| 5,124,803 | 6/1992 | Troxel | 358/298 |
| 5,150,225 | 9/1992 | Kreitman | 358/456 |
| 5,227,895 | 7/1993 | Carlebach | 358/456 |
| 5,260,807 | 11/1993 | Tai | 358/456 |

FOREIGN PATENT DOCUMENTS

| | | |
|---|---|---|
| 303190 | 2/1989 | European Pat. Off. |
| 2827596 | 11/1984 | Germany |
| 62-112478 | 5/1987 | Japan |
| 1183274 | 7/1989 | Japan |
| 335867 | 5/1991 | Japan |

*Primary Examiner*—Paul Ip
*Attorney, Agent, or Firm*—Cushman, Darby & Cushman

[57] ABSTRACT

A screen dot image recording method is disclosed in which whether or not each minimum recording element of an image recording system is to be recorded is determined on the basis of a gray level obtained from an original. A matrix is prepared which has a size capable of including each of screen dot blocks arranged at a predetermined pitch in directions inclined at a predetermined angle with respect to an orthogonal coordinate system based on recording directions of the recording system and has a plurality of matrix elements one of which is defined as a reference element. From among reference points which have a fixed positional relationship therebetween in the screen dot blocks, there is determined a reference point which exists in a screen dot block including a recording element. Another recording element has a coordinate value obtained by converting the coordinate of the determined reference point into an integer value. There is selected a matrix element having a positional relation of that matrix element with the reference element of the matrix which is the same as a positional relation of the recording element with said another recording element. The selected matrix element is compared as a threshold value with a gray level assigned to the recording element to determine whether or not the recording element is to be recorded as a part of a screen dot. Thereby, there is recorded a screen dot image which has any screen angle and any screen pitch and in which each screen dot has a desired form and a desired size corresponding to a gray level.

2 Claims, 20 Drawing Sheets

| FIG. 3A |
|---|
| FIG. 3B |
| FIG. 3C |

| FIG. 3A |
| FIG. 3B |
| FIG. 3C |

| FIG. 4A |
| FIG. 4B |
| FIG. 4C |

| FIG. 4 |
|---|
| FIG. 4A |
| FIG. 4B |
| FIG. 4C |

FIG. 6

| FIG. 6A |
| FIG. 6B |
| FIG. 6C |

FIG. 6A

| 250 | 250 | 226 | 210 | 210 | 210 | 162 | 162 | 236 | 236 | 252 | 252 | 252 | 252 | 252 |
|---|---|---|---|---|---|---|---|---|---|---|---|---|---|---|
| 250 | 250 | 226 | 210 | 210 | 118 | 114 | 162 | 162 | 236 | 244 | 252 | 252 | 252 | 252 |
| 250 | 250 | 226 | 210 | 210 | 118 | 114 | 146 | 154 | 196 | 220 | 228 | 228 | 228 | 228 |
| 250 | 250 | 226 | 202 | 170 | 98 | 66 | 90 | 122 | 180 | 188 | 204 | 212 | 212 | 212 |
| 250 | 242 | 218 | 186 | 136 | 82 | 42 | 50 | 74 | 108 | 130 | 172 | 212 | 212 | 212 |
| 234 | 234 | 194 | 178 | 106 | 58 | 18 | 26 | 34 | 60 | 84 | 100 | 142 | 142 | 212 |
| 234 | 168 | 160 | 128 | 80 | 40 | 14 | 2 | 10 | 20 | 44 | 68 | 138 | 138 | 164 |
| 168 | 168 | 152 | 96 | 56 | 32 | 6 | 0 | 4 | 28 | 52 | 92 | 150 | 164 | 164 |
| 168 | 140 | 140 | 72 | 48 | 24 | 16 | 8 | 12 | 36 | 76 | 124 | 156 | 164 | 238 |
| 216 | 144 | 144 | 104 | 88 | 64 | 38 | 30 | 22 | 62 | 110 | 182 | 198 | 238 | 238 |
| 216 | 216 | 216 | 176 | 134 | 112 | 78 | 54 | 46 | 86 | 132 | 190 | 222 | 246 | 254 |
| 216 | 216 | 216 | 208 | 192 | 184 | 126 | 94 | 70 | 102 | 174 | 206 | 230 | 254 | 254 |
| 232 | 232 | 232 | 232 | 224 | 200 | 158 | 148 | 116 | 120 | 214 | 214 | 230 | 254 | 254 |
| 255 | 255 | 255 | 255 | 248 | 240 | 166 | 166 | 116 | 120 | 214 | 214 | 230 | 254 | 254 |
| 255 | 255 | 255 | 255 | 255 | 240 | 240 | 166 | 166 | 214 | 214 | 214 | 230 | 254 | 254 |

| FIG. 6A |
|---------|
| FIG. 6B |
| FIG. 6C |

| 250 | 250 | 226 | 210 | 210 | 210 | 162 | 162 | 236 | 236 | 252 | 252 | 252 | 252 | 252 |
|-----|-----|-----|-----|-----|-----|-----|-----|-----|-----|-----|-----|-----|-----|-----|
| 250 | 250 | 226 | 210 | 210 | 118 | 114 | 162 | 162 | 236 | 244 | 252 | 252 | 252 | 252 |
| 250 | 250 | 226 | 210 | 210 | 118 | 114 | 146 | 154 | 196 | 220 | 228 | 228 | 228 | 228 |
| 250 | 250 | 226 | 202 | 170 | 98 | 66 | 90 | 122 | 180 | 188 | 204 | 212 | 212 | 212 |
| 250 | 242 | 218 | 186 | 136 | 82 | 42 | 50 | 74 | 108 | 130 | 172 | 212 | 212 | 212 |
| 234 | 234 | 194 | 178 | 106 | 58 | 16 | 26 | 34 | 60 | 84 | 100 | 142 | 142 | 212 |
| 234 | 168 | 160 | 128 | 80 | 40 | 14 | 2 | 10 | 20 | 44 | 68 | 138 | 138 | 164 |
| 168 | 168 | 152 | 96 | 56 | 32 | 6 | 0 | 4 | 28 | 52 | 92 | 150 | 164 | 164 |
| 168 | 140 | 140 | 72 | 48 | 24 | 18 | 8 | 12 | 36 | 76 | 124 | 156 | 164 | 238 |
| 216 | 144 | 144 | 104 | 88 | 64 | 38 | 30 | 22 | 62 | 110 | 182 | 198 | 238 | 238 |
| 216 | 216 | 216 | 176 | 134 | 112 | 78 | 54 | 46 | 86 | 132 | 190 | 222 | 246 | 254 |
| 216 | 216 | 216 | 208 | 192 | 184 | 126 | 94 | 70 | 102 | 174 | 206 | 230 | 254 | 254 |
| 232 | 232 | 232 | 232 | 224 | 200 | 158 | 148 | 116 | 120 | 214 | 214 | 230 | 254 | 254 |
| 255 | 255 | 255 | 255 | 248 | 240 | 166 | 166 | 116 | 120 | 214 | 214 | 230 | 254 | 254 |
| 255 | 255 | 255 | 255 | 255 | 240 | 240 | 166 | 166 | 214 | 214 | 214 | 230 | 254 | 254 |

| 250 | 250 | 226 | 210 | 210 | 210 | 162 | 162 | 236 | 236 | 252 | 252 | 252 | 252 | 252 |
|-----|-----|-----|-----|-----|-----|-----|-----|-----|-----|-----|-----|-----|-----|-----|
| 250 | 250 | 226 | 210 | 210 | 118 | 114 | 162 | 162 | 236 | 244 | 252 | 252 | 252 | 252 |
| 250 | 250 | 226 | 210 | 210 | 118 | 114 | 146 | 154 | 196 | 220 | 228 | 228 | 228 | 228 |
| 250 | 250 | 226 | 202 | 170 | 96  | 66  | 90  | 122 | 180 | 188 | 204 | 212 | 212 | 212 |
| 250 | 242 | 218 | 186 | 136 | 82  | 42  | 50  | 74  | 108 | 130 | 172 | 212 | 212 | 212 |
| 234 | 234 | 194 | 178 | 106 | 58  | 18  | 26  | 34  | 60  | 84  | 100 | 142 | 142 | 212 |
| 234 | 168 | 160 | 128 | 80  | 40  | 14  | 2   | 10  | 20  | 44  | 68  | 138 | 138 | 164 |
| 168 | 168 | 152 | 96  | 56  | 32  | 6   | 0   | 4   | 28  | 52  | 92  | 150 | 164 | 164 |
| 168 | 140 | 140 | 72  | 48  | 24  | 16  | 8   | 12  | 36  | 76  | 124 | 156 | 164 | 238 |
| 216 | 144 | 144 | 104 | 88  | 64  | 38  | 30  | 22  | 62  | 110 | 182 | 198 | 238 | 238 |
| 216 | 216 | 216 | 176 | 134 | 112 | 78  | 54  | 46  | 86  | 132 | 190 | 222 | 246 | 254 |
| 216 | 216 | 216 | 208 | 192 | 184 | 126 | 94  | 70  | 102 | 174 | 206 | 230 | 254 | 254 |
| 232 | 232 | 232 | 232 | 224 | 200 | 158 | 148 | 116 | 120 | 214 | 214 | 230 | 254 | 254 |
| 255 | 255 | 255 | 255 | 248 | 240 | 166 | 166 | 116 | 120 | 214 | 214 | 230 | 254 | 254 |
| 255 | 255 | 255 | 255 | 255 | 240 | 240 | 166 | 166 | 214 | 214 | 214 | 230 | 254 | 254 |

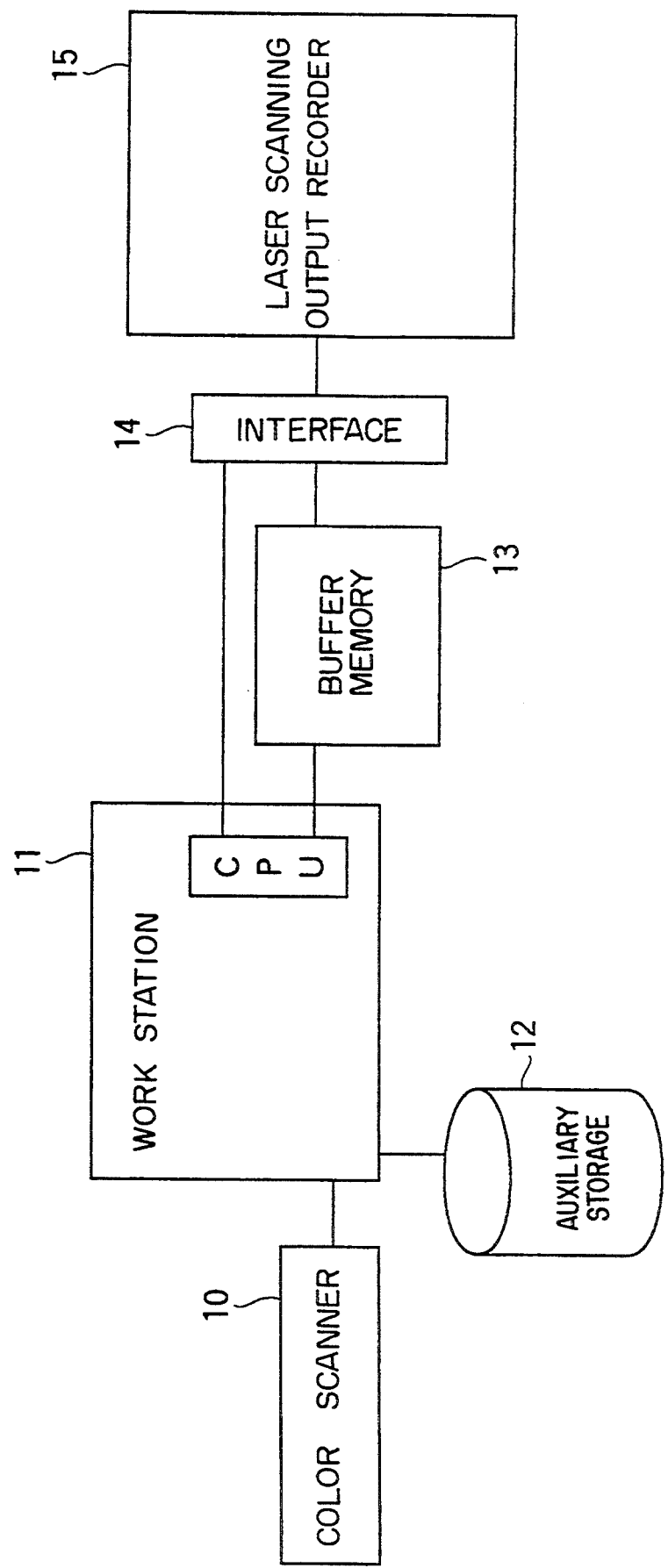

SCREEN DOT IMAGE RECORDING METHOD

BACKGROUND OF THE INVENTION

The present invention relates to a method of rendering or reproducing the half tone of a colored original by digitally producing a screen dot image having any screen angle and any screen pitch on the basis of image data read from the colored original by an image input device such as a color scanner.

In the case where a print is produced from image data with gray levels read from a colored original by an image input device such as a color scanner, the colored original is photoelectrically scanned to obtain three primary color signals. Next, the color signals are subjected to color correction and are thereafter converted into image signals for color separations "magenta", "cyan", "yellow" and "black" Further, there is generated a screen dot which has a screen percentage corresponding to a gray level of the image signal. The screen dots are periodically arranged and the period of arrangement is called a screen pitch. A photosensitive recording medium is exposed to light from a light source luminance-modulated by a recording signal for generating the screen dot so that each color separation is obtained. Thereafter, superimposed or registered printing is made by a printer using inks of colors corresponding to the color separations, thereby obtaining a final image rendered.

In actuality, printing with accurate registration of screen dots of the respective color separations is not possible and a minute deviation in screen dot period and screen dot direction between the color separations yields moiré pattern. A fringe pattern or the like, which is not included in the original, appears in a print due to the moiré pattern, thereby deteriorating the renderability or reproducibility of the original. It is possible to make the moiré inconspicuous by changing an angle at which screen dots in each of the four color separations are arranged. This angle is called a screen angle. It is known that the combination of screen angles of 0°, 15°, 45° and 75° is preferable in order to minimize an influence of the moiré in a four-color printing.

The conventional method of recording an image of screen dots having such a screen angle includes a method in which a lith type film for recording is brought into close contact with a contact screen and is subjected to exposure.

In recent years, on the other hand, various methods of electronically forming screen dots have been developed and put into practical use. The fundamentals of those methods are such that a recording medium is divided into recording elements smaller than a screen pitch and a digital recording signal for determining whether or not the recording element is to be recorded is generated in accordance with the gray level of an image signal so that the recording medium is subjected to exposure. In general, a matrix of threshold values is used in generating the recording signal. Namely, a matrix element corresponding to the recording element is selected, and a threshold value of the selected matrix element and a gray level of the image signal are compared to generate a recording signal in accordance with a relationship in magnitude between both the values. Screen dots can be generated periodically by using the matrix elements periodically. In this case, what is important in order to prevent the moiré pattern from occurring, is how to generate screen dots having a desired screen angle.

One example of a method of electronically generating screen dots having a desired screen angle includes a screen dot image generating method disclosed by U.S. Pat. No. 4,499,489. However, a screen dot image generated by this method involves a problem that the number of pixels forming each screen dot and the form of a screen dot are different even in the case where a fixed gray level is represented and an undesirable ruggedness may appear in the form of the screen dot. Especially, in a region where the form of a screen dot is small, there is a problem that a reproduced image exhibits an undesirable appearance rough to the feel, thereby resulting in the deterioration of quality of the reproduced image.

SUMMARY OF THE INVENTION

An object of the present invention is to solve the above problem or to obtain a better screen dot image which has any screen angle and any screen pitch and in which the form of each screen dot takes a predetermined desirable form.

According to the present invention, there is provided a screen dot image recording method in which a gray level assigned to a recording element as the minimum recording unit of an image recording system and obtained from a half-tone original and a threshold value for determining whether or not the recording element is to be recorded as a constituent element of a screen dot, are compared to record screen dots arranged at a desired period in a direction inclined at a desired angle with respect to an orthogonal coordinate system in which recording directions of the image recording system are taken as coordinate axes and the size of the recording element is taken as the unit of the coordinate system, thereby rendering the half tone of the original. First, a matrix D having threshold values as matrix elements is prepared. The matrix D has a size capable of including the whole of a screen dot block when the matrix elements are superimposed on recording elements with the row and column of the matrix D being directed parallel to the coordinate system and has as a reference element of the matrix D one matrix element which is superimposed on a recording element including one reference point defined in the screen dot block. The screen dot block is a grid region repeated at the desired period in the direction inclined at the desired angle with respect to the coordinate system. All of the relative position of the reference point among each screen dot block are identical and fixed. Next, there is determined the coordinate of a reference point B of a screen dot block P in which a recording element A is included. A matrix element E of the matrix D is selected as a threshold value to be compared with a gray level assigned to the recording element A. The position of the selected matrix element E relative to the reference element of the matrix D is the same as the position of the recording element A relative to a recording element B' which has a coordinate value obtained by converting the coordinate of the reference point B into an integer. The gray level assigned to the recording element A and the threshold value are compared to determine whether or not the recording element A is to be recorded.

BRIEF DESCRIPTION OF THE DRAWINGS

FIGS. 6, 6A to 6C show examples of screen dots with different gray levels together with a matrix of threshold values;

FIGS. 9, 9A to 9D are flow charts of processings in a third embodiment of the present invention; and FIG. 10 is a block diagram showing the construction of a system used in the embodiment of the present invention.

DESCRIPTION OF THE PREFERRED EMBODIMENTS

Figures 3, 3A:
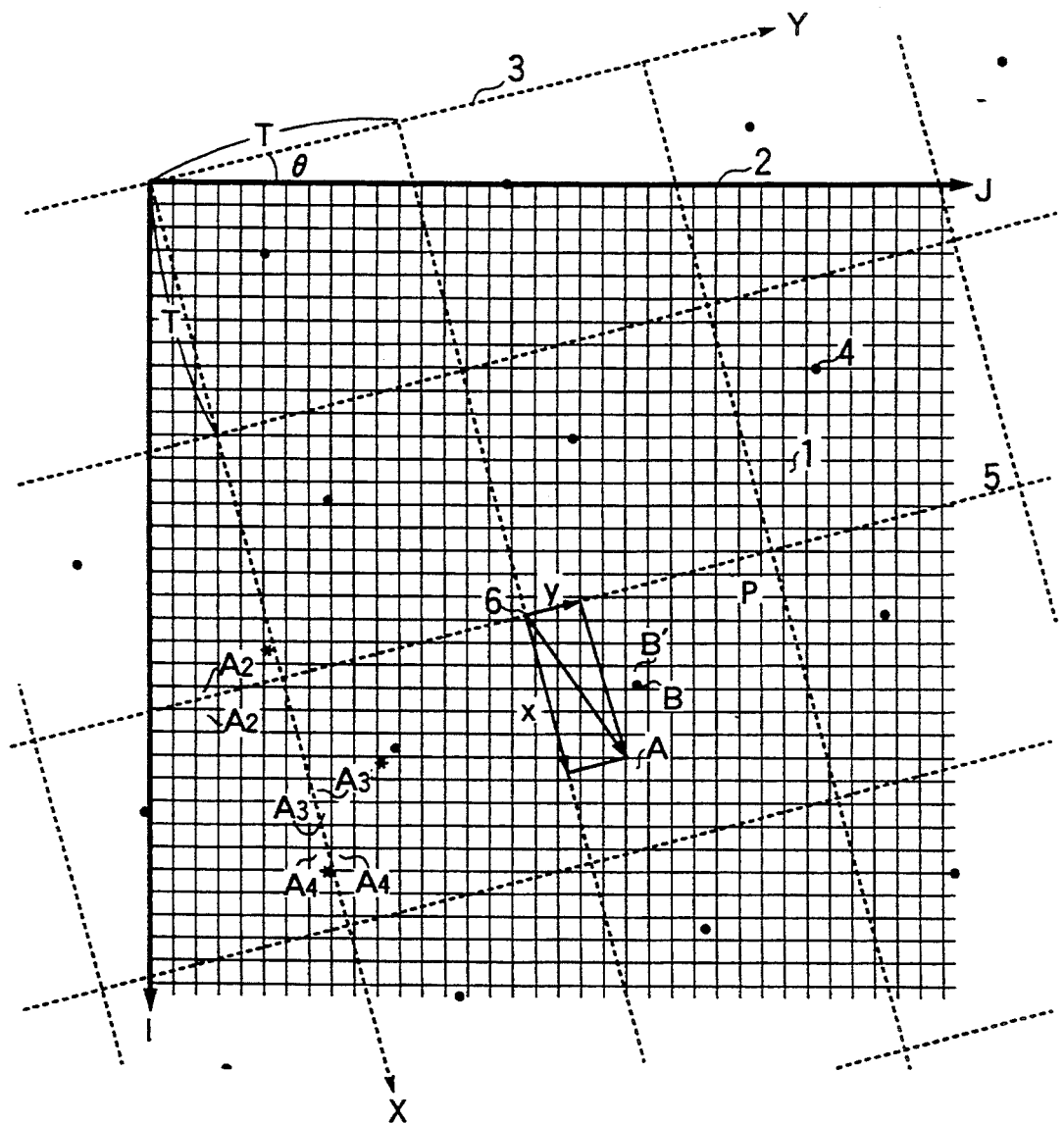
FIGS. 3, 3A and 3B show a coordinate system used in the present invention.

An orthogonal coordinate system used in the present invention is shown in FIG. 3A. FIG. 3C is an enlarged diagram of FIG. 3A in the vicinity of the origin of the coordinate system. Supposing the case where a screen dot image is produced through a sequential scanning in a main scanning direction and a subsidiary scanning direction which are recording directions of an image recording system, it is assumed that a J axis of the coordinate system 2 is the main scanning direction and an I axis thereof is the subsidiary scanning direction. It is also assumed that the size of a recording element 1 is taken as the minimum unit of the I-J coordinate system. Accordingly, the coordinates of the recording element 1 takes an integer value in the I-J coordinate system. For example, the coordinates of a recording element A in FIG. 3A is (25, 21). A recording element having a coordinate (i, j) is denoted as a recording element (i, j). Also, one grid region shown by broken line 3 represents a screen dot block 5. The screen dot block 5 is a grid region which is repeated at a screen pitch T in directions inclined at a screen angle 8 with respect to the I-J coordinate system 2. Those directions are taken as X and Y directions. The screen pitch T is represented at the same unit as the coordinate system. Though not shown, a gray level or data p(i, j) is assigned to each recording element.

Next, the basic principle of the present invention will explained using FIGS. 3A and FIGS. 4A to 4C.

Figures 4, 4A:
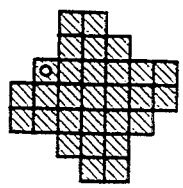
FIGS. 4, 4A to 4C are diagrams for explaining the principle of the present invention, more particularly, FIG. 4A showing a screen dot which renders a gray level p, FIG. 4B being a diagram in which a reference point in FIG. 4A is superimposed on a reference point of a screen dot block in FIG. 3A, and FIG. 4C being a diagram in which screen dots are parallely moved from FIG. 4B so that they coincide or registered with recording elements.
Figure 4:
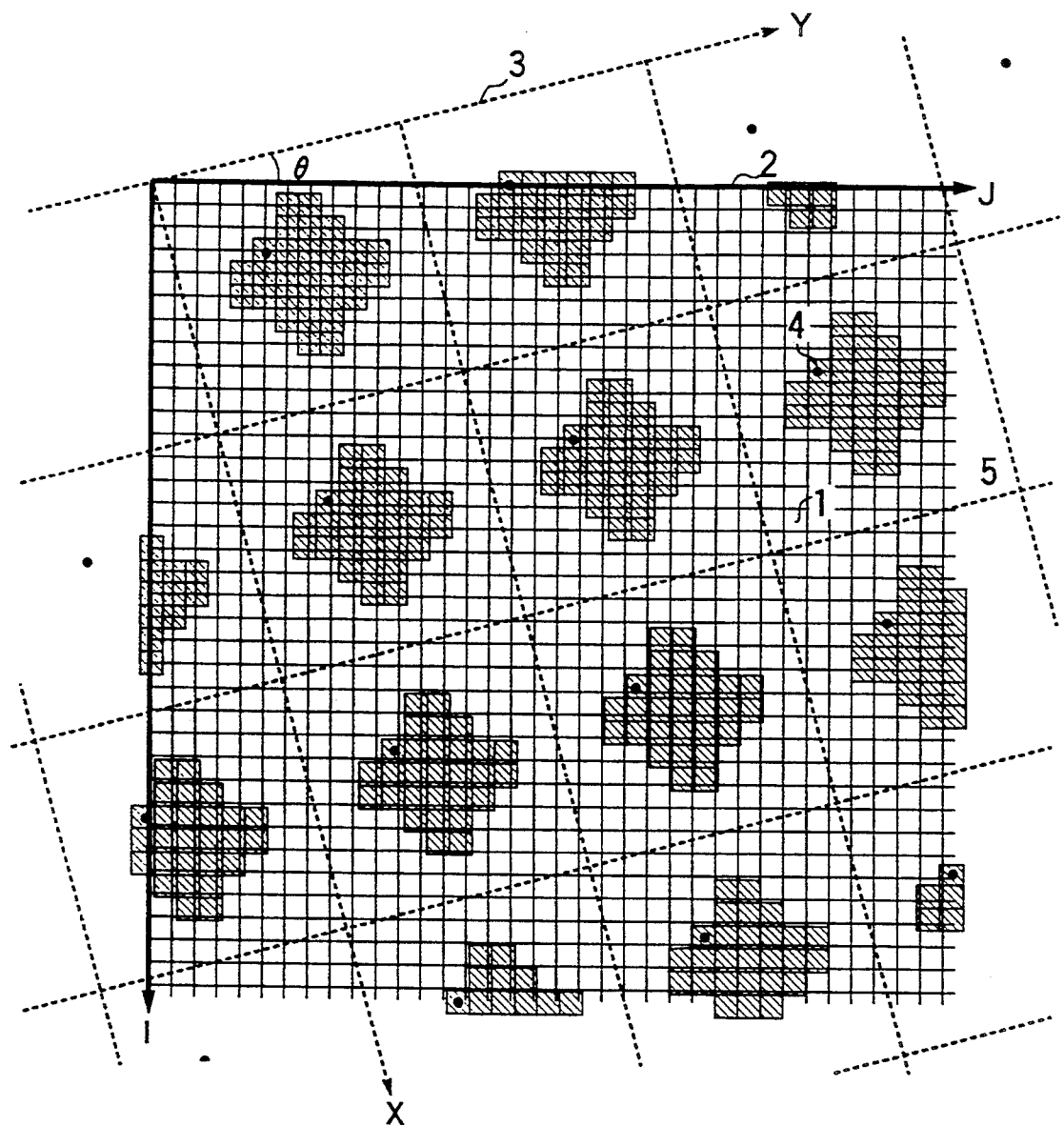

The explanation will be made taking by way of example a method of producing a screen dot image of an original the gray level of which is a fixed value p. The form of a screen dot in this case is determined by a matrix D which is beforehand prepared. Suppose that a shaded portion in FIG. 4A shows a screen dot for rendering the gray level p. Such screen dots are generated at a desired screen angle and a desired screen pitch. Namely, a work is conducted in which the screen dots are arranged at a fixed interval as if a picture shown in FIG. 4A was pasted. In order to determine a position at which a screen dot is to be pasted, there are required a reference point in the screen dot which is to be pasted and a reference point at a place where the screen dot is to be pasted. A reference point of a screen dot is denoted by a mark in FIG. 4A and a reference point 4 of a place where the screen dot is to be pasted is denoted by a mark ● in FIG. 3A. The mark ● of the reference points 4 are arranged at an interval of the screen pitch T in directions inclined at the screen angle $\theta$ with respect to the I and J axes. Also, since the screen dot blocks 5 are similarly arranged, it always follows that one reference point 4 exists for each screen dot block 5, and that all of the relative position of the reference point in the corresponding screen dot block are identical and fixed.

Figures 4, 4A, 4B, 4C:
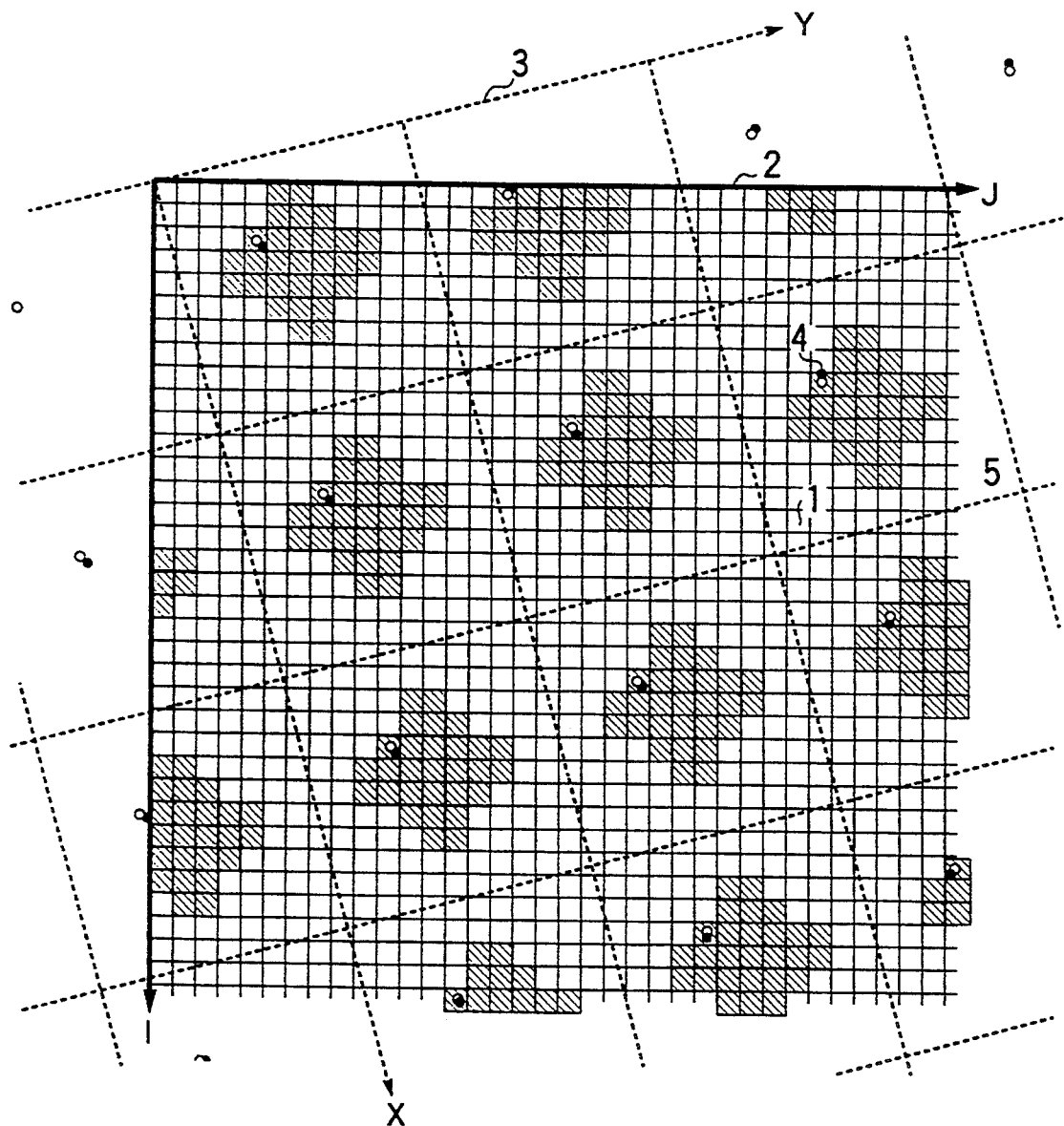

FIG. 4B is a diagram in which the mark in FIG. 4A is superimposed on each mark ● in FIG. 3A. The minimum unit for recording in the image recording system is a recording element, that is, one square in FIG. 4B. However, since the shaded portion in FIG. 4B deviates from the squares, it is not possible to effect actual recording. Therefore, the screen dots are parallely moved so that the shaded portions are registered with the squares, as shown in FIG. 4C. Namely, a screen dot image is produced by superimposing the mark of FIG. 4A on a recording element which includes the reference point 4.

According to the above method, a better screen dot having a predetermined desirable form for the gray level p is rendered. Of course, the same procedure can also be taken for the case where the gray level is not fixed. If the unit to be pasted is formed by a plurality of screen dots and a screen dot block is defined to have a size capable of accommodating the plurality of screen dots therein, it is possible to pasted the plurality of screen dots at once.

Figure 5A:
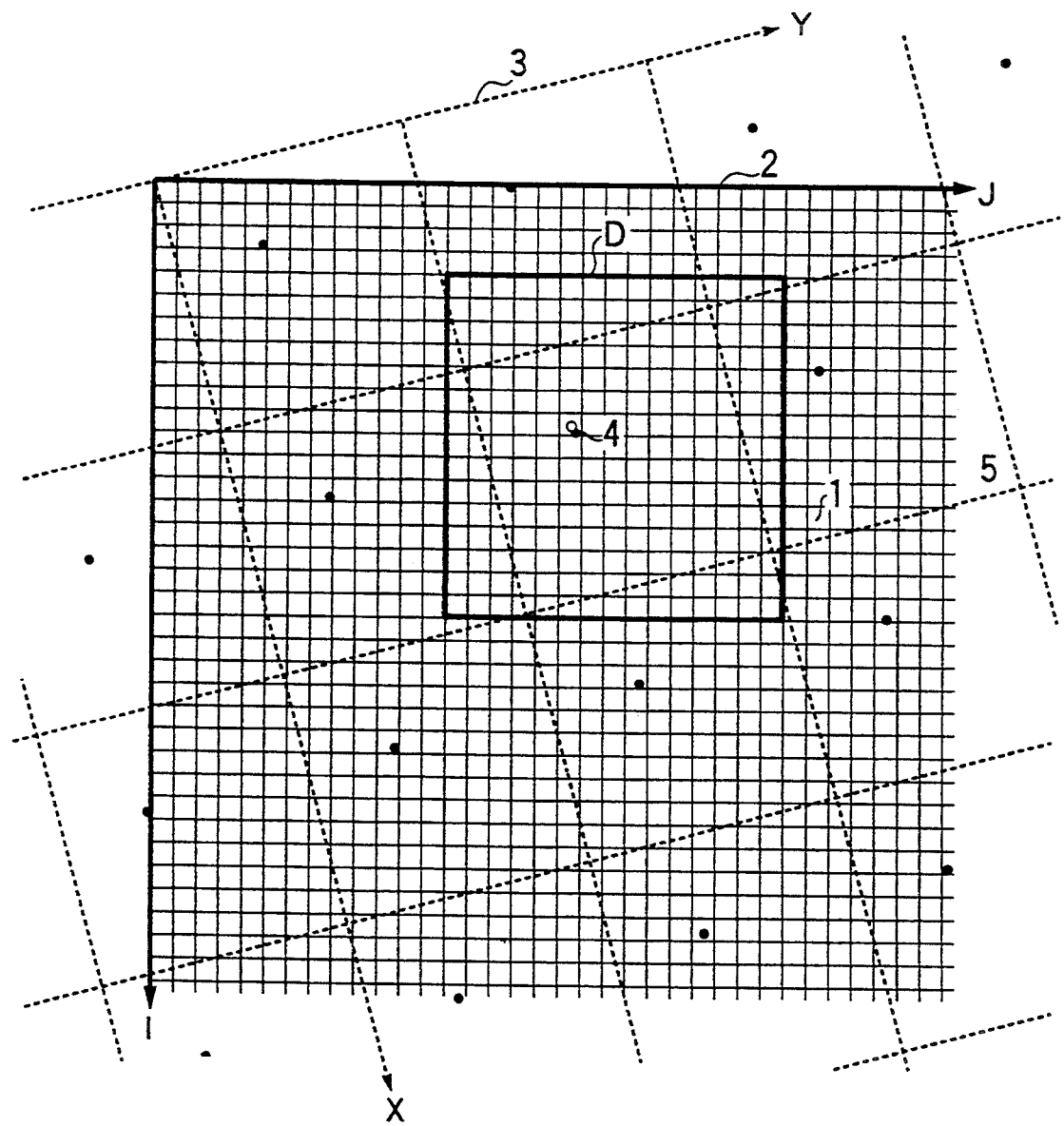
FIGS. 5, 5A and 5B are diagrams representing a relationship between screen dot blocks and a matrix, FIG. 5A being a diagram in which the matrix is superimposed on the screen dot blocks and FIG. 5B being a diagram for explaining a relationship between the screen dot block and a reference element of the matrix.

In the case where an image is actually reproduced by screen dots, there is employed not a method in which a screen dot is pasted after the form of the screen dot has been determined but a method in which a matrix D having, as matrix elements, threshold values to be compared with gray levels assigned to recording elements is pasted in a manner similar to that shown in FIG. 4C and the form of a screen dot is determined by selecting elements of the matrix D. An element at the m-th row and the n-th column of the matrix D is represented by D(m, n). FIG. 5A shows a diagram in which the matrix D is directed parallel to the I-J coordinate system so that the matrix elements and the recording elements are superimposed on each other, in a manner similar to the screen dot pasting manner explained in conjunction with FIG. 4C. In order to successively paste the matrix D so as to cover the entire recording area leaving no space, it is required that the matrix D includes one screen dot block completely therein. Accordingly, it is required that the size M×N of the matrix D satisfies the following relation:

$$M, N \geq [T(|\sin \theta| + |\cos \theta|) + 1] \quad (1)$$

where the factor of +1 is omitted in the case where $T(\sin \theta + \cos \theta)$ is an integer, and [ ] denotes Gauss' symbol and represents the maximum integer which does not exceed a numeral in [ ]. The right side of the relation (1) is the minimum matrix size which completely includes one screen dot block.

Figures 5, 5A, 5B:
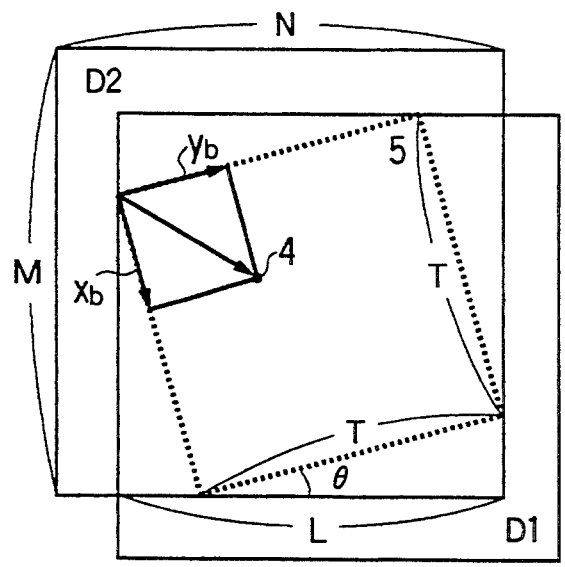

Similarly to the reference point for the screen dot to be pasted, as shown in FIG. 4A, one reference element is required for the matrix D. As apparent from FIG. 5A, a matrix element coincident to a recording element ($\mu'$, $\nu'$) including the reference point 4 of the screen dot block 5 may be taken as a reference element $D(m_o, n_o)$ of the matrix D. In FIG. 5A, this reference element is denoted by a mark . Accordingly, a threshold value to be compared with a gray level assigned to the recording element ($\mu'$, $\nu'$) is $D(m_o, n_o)$. A range, which $m_o$ and $n_o$ can take within matrix D, is determined by the relative position $x_b$, $y_b$ of the reference point 4 in the screen dot block 5 (see FIG. 5B) and the size M, N of the matrix D which satisfies the relation (1). Here, $x_b$ and $y_b$ can take any values which satisfy $0 \leq x_b \leq T$ and $0 \leq y_b \leq T$. When the matrix D is arranged in D1, as shown in FIG. 5B, $m_o$ and $n_o$ become the minimum and are $$m_o = [x_b \cos \theta + (T - y_b) \sin \theta] + 1$$

$$n_o = [x_b \sin \theta + y_b \cos \theta] + 1$$

where +1 in the right side is taken assuming that the matrix element is numbered starting from 1. On the other hand, when the matrix D is arranged in D2, $m_o$ and $n_o$ become the maximum and are $$m_o = [M - L + x_b \cos \theta + (T - y_b) \sin \theta]$$

$$n_o = [N - L + x_b \sin \theta + y_b \cos \theta]$$

where $L = T(|\cos \theta| + |\sin \theta|)$. Accordingly, possible values of $m_o$ and $n_o$, which they can take, are integer values between the minimum and maximum values shown above. This holds for the case where $0° \leq \theta \leq 90°$. A procedure similar to that explained in conjunction with FIG. 5B can be taken for other values of $\theta$, too. A range of integer values, which $m_o$ and $n_o$ can take, are summarized as follow:

$$[d_m] + 1 \leq m_o \leq [M - L + d_m] \quad (2)$$

$$[d_n] + 1 \leq n_o \leq [N - L + d_n] \quad (3)$$

where in the case of $90° \leq \theta \leq 180°$ $$d_m = -(T - x_b) \cos \theta + (T - y_b) \sin \theta$$

$$d_n = x_b \sin \theta - (T - y_b) \cos \theta,$$

in the case of $0° \leq \theta \leq 90°$ $$d_m = x_b \cos \theta + (T - y_b) \sin \theta$$

$$d_n = x_b \sin \theta + y_b \cos \theta$$

in the case of $-90° \leq \theta \leq 0°$ $$d_m = x_b \cos \theta - y_b \sin \theta$$

$$d_n = -(T - x_b) \sin \theta + y_b \cos \theta, \text{ and}$$

in the case of $-180° \leq \theta \leq -90°$ $$d_m = -(T - x_b) \cos \theta - y_b \sin \theta$$

$$d_n = -(T - x_b) \sin \theta - (T - y_b) \cos \theta$$

Especially, in the case where the minimum matrix size satisfying the relation (1) is selected, only one integer value is determined for each of $m_o$ and $n_o$, that is, $$m_o = [d_m] + 1 \quad (2')$$

$$n_o = [d_n] + 1 \quad (3')$$

Further, if a reference point of a screen dot block is selected to be the center point of the block, each of $x_b$ and $y_b$ is equal to T/2 and hence $m_o$ and $n_o$ are simplified irrespective of the range of $\theta$ as follow:

$$m_o = n_o = [L/2] + 1 \quad (4)$$

The matrix element D(m, n) of the matrix D having the size M×N and one reference element $D(m_o, n_o)$ thus determined may be assigned a proper threshold value so that a desired form and a desired size of a screen dot can be rendered in accordance with a gray level. A specific example will be shown later on in conjunction with a first embodiment of the present invention.

Next, there is determined the coordinate ($\mu$, $\nu$) of a reference point 4 of a screen dot block 5 which includes a recording element (i, j). If this coordinate is determined, it is possible to know a recording element ($\mu'$, $\nu'$) on which the reference element $D(m_o, n_o)$ is to be superimposed. The recording element ($\mu'$, $\nu'$) is determined by converting the coordinate ($\mu$, $\nu$) of the reference point 4 into an integer value in accordance with the following equations:

$$\mu' = [\mu] \quad (5)$$

$$\nu' = [\nu]. \quad (6)$$

Provided that a threshold value to be compared with a gray level assigned to the recording element (i, j) is a matrix element D(m, n) which is superimposed on the recording element (i, j), the position of the recording element (i, j) relative to the recording element ($\mu'$, $\nu'$) becomes the same as the position of the matrix element D(m, n) relative to the reference element $D(m_o, n_o)$ of the matrix D. Accordingly, m and n can be determined by the following equations:

$$m = i - \mu' + m_o \quad (7)$$

$$n = j - \nu' + n_o. \quad (8)$$

Since two elements of the matrix to be compared with gray levels assigned to two adjacent recording elements in one screen dot block are adjacent to each other, there is no possibility that the same element of the matrix D is selected. Therefore, it is possible to generate a screen dot, as desired, when threshold values are assigned to matrix elements.

In order to determine the coordinate ($\mu$, $\nu$) of the reference point 4 of the screen dot block 5 including the recording element (i, j), it is convenient to use the coordinate of a reference point of a screen dot block in which a recording element adjacent to the recording element (i, j) is included. Then, consider a positional relationship between a screen dot block P* which includes a recording element A* and a screen dot block P which includes a recording element A having a coordinate larger than the coordinate of A* by 1 in the I or J coordinate value. Here, it is defined that x and y are the relative position of the recording element A in the screen dot block P, that is, the component of projection of a vector from a fixed point of the screen dot block P toward the recording element A to the X direction and the component thereof to the Y direction, respectively. The fixed point of the screen dot block can be defined arbitrarily. In FIG. 3A, the fixed point of the screen dot block is defined to be the left and upper corner 6 of the same block, and a vector from the fixed point to the recording element A and the projection components x and y of the vector are shown. In this case, each of x and y takes a value between 0 and T (or the screen pitch).

The increments of x and y, when the I coordinate is increased by 1, are the components of projection of a side parallel to the I axis of one recording element to the X and Y directions. The increments $\Delta x_i$ and $\Delta y_i$ are shown in FIG. 3C. These are represented by use of the screen angle $\theta$ as follow:

$$\Delta x_i = \cos \theta \quad (9)$$

$$\Delta y_i = -\sin \theta. \quad (10)$$

Then, x and y of the recording element A are represented by the following equations using x* and y* indicative of the relative position of the recording element A* in the screen dot block P*:

$$x = x^* + \Delta x_i \quad (11)$$

$$y = y^* + \Delta y_i. \quad (12)$$

On the other hand, since the increments of x and y when the J coordinate is increased by 1 are $\Delta x_j$ and $\Delta y_j$ shown in FIG. 3C, like the case of the I coordinate, $\Delta x_j$, $\Delta y_j$, x and y are represented by the following equations:

$$\Delta x_j = \sin \theta \quad (13)$$

$$\Delta y_j = \cos \theta \quad (14)$$

$$x = x^* + \Delta x_j \quad (15)$$

$$y = y^* + \Delta y_j. \quad (16)$$

If at least one of x and y thus determined is outside the range between 0 and T, it means that the screen dot block P including the recording element A and the screen dot block P* including the recording element A* are different from each other. If x and y are both within the range between 0 and T, the recording elements A and A* are included in the same screen dot block (P=P*). The following classification is made depending on the values of x and y.

(Case 1) x<0

Figures 3, 3B:
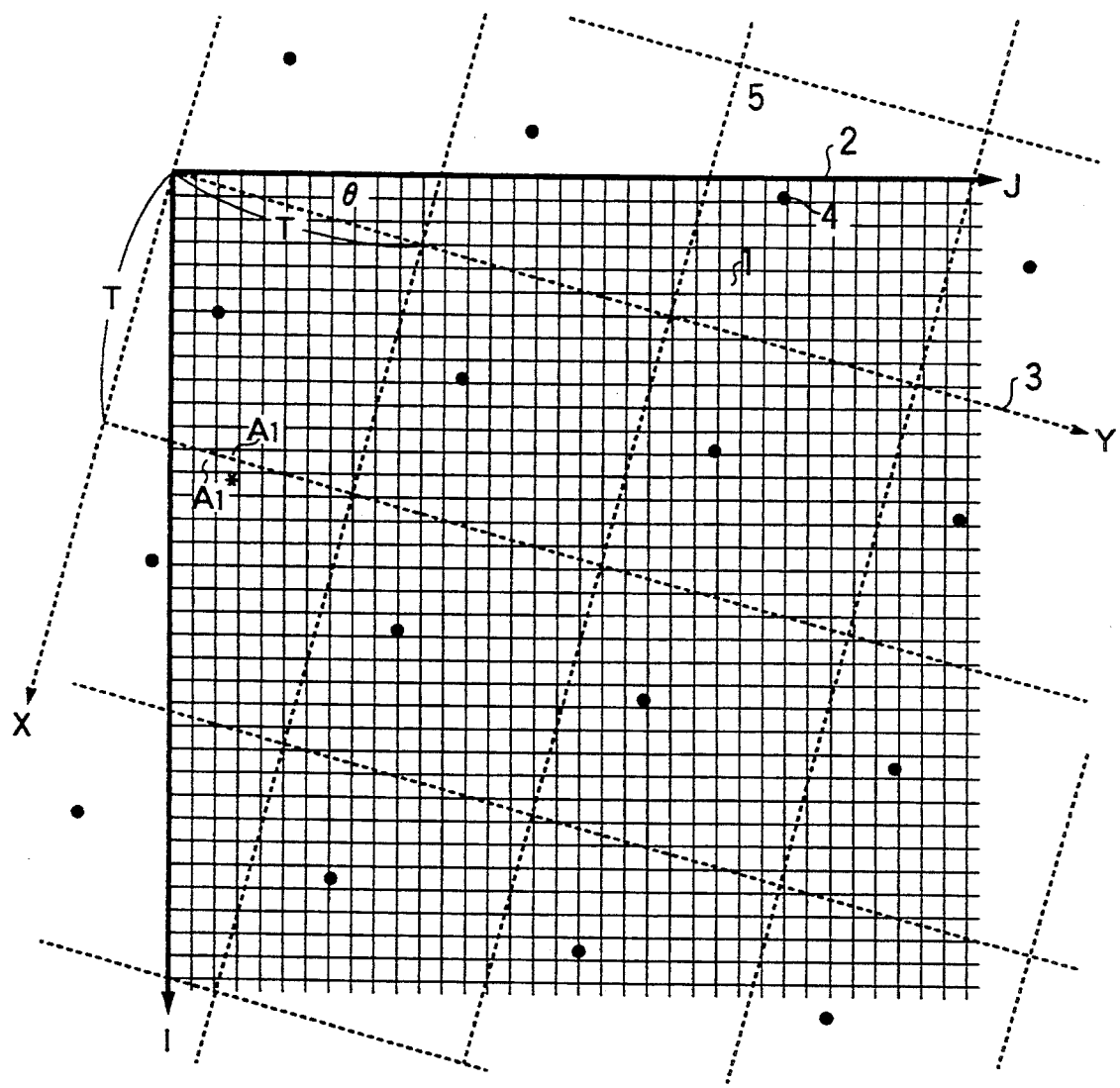
Figure 3C:
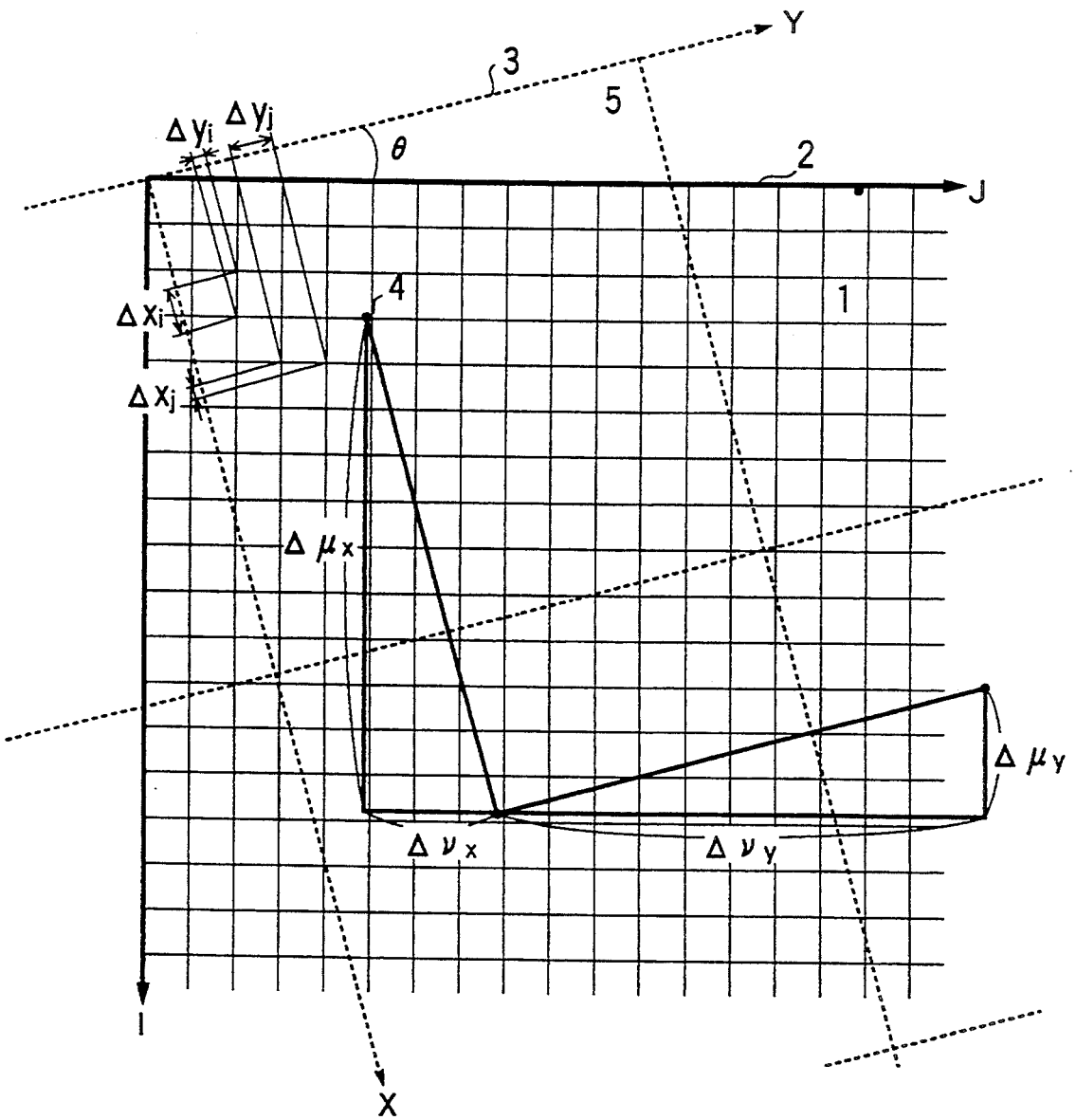
FIG. 3C is an enlarged diagram of the coordinate system of FIG. 3A in the vicinity of the origin thereof.

The positional relationship between the screen dot block P including the recording element A(i, j) and the screen dot block P* including the recording element A*(i*, j*) having the i or j value smaller than that of A by 1 is such that P is adjacent to P* in a negative direction of the X axis, distanced therefrom by one block (as in the case of $A_1$ and $A_{1*}$ in FIG. 3B). This occurs when $\Delta x_i < 0$, i=i*+1 and j=j* or when $\Delta x_j < 0$, i=i* and j=j*+1.

(Case 2) x≧T

P is adjacent to P* in a positive direction of the X axis, distanced therefrom by one block (as in the case of $A_2$ and $A_{2*}$ in FIG. 3A). This occurs when $\Delta x_i > 0$, i=i*+1 and j=j* or when $\Delta x_j > 0$, i=i* and j=j*+1.

(Case 3) y<0

P is adjacent to P* in a negative direction of the Y axis, distanced therefrom by one block (as in the case of $A_3$ and $A_{3*}$ in FIG. 3A). This occurs when $\Delta y_i < 0$, i=i*+1 and j=j* or when $\Delta y_j < 0$, i=i* and j=j*+1.

(Case 4) y≧T

P is adjacent to P* in a positive direction of the Y axis, distanced therefrom by one block (as in the case of $A_4$ and $A_{4*}$ in FIG. 3A). This occurs when $\Delta y_i > 0$, i=i*+1 and j=j* or when $\Delta y_j > 0$, i=i* and j=j*+1.

The Case 1 or 2 and the Case 3 or 4 may be satisfied simultaneously. In that case, the screen dot blocks P and P* are positioned in an oblique relation.

(Case 5) 0≦x<T and 0≦y<T

The recording element A and the recording element A* are included in the same screen dot block.

If a positional relationship between screen dot blocks is known in a manner mentioned above, the coordinate $(\mu, \nu)$ of the reference point of the screen dot block P including the recording element A can be determined simply by the following manner from the coordinate $(\mu^*, \nu^*)$ of the reference point of the screen dot block P* includes the recording element A* which is adjacent to the recording element A.

In the Cases 1 to 4, since the screen dot blocks P and P* are adjacent to each other, the coordinate $(\mu, \nu)$ of the reference point of the screen dot block P may be determined in such a manner that a displacement of one screen dot block in coordinate, which is determined by the screen angle $\theta$ and the screen pitch T, is added to or subtracted from the coordinate $(\mu^*, \nu^*)$ of the reference point of the screen dot block P*. In the case where the screen dot blocks are adjacent to each other in the X direction (or in the Cases 1 and 2), a displacement $\Delta \mu_x$ in the I-axis direction and a displacement $\Delta \nu_x$ in the J-axis direction corresponding to one screen dot block, as shown in FIG. 3C, are represented by the following equations:

$$\Delta \mu_x = T \cos \theta \quad (17)$$

$$\Delta \nu_x = T \sin \theta. \quad (18)$$

In the case where the screen dot blocks are adjacent to each other in the Y direction (or in the Cases 3 and 4), a displacement $\Delta \mu_y$ in the I-axis direction and a displacement $\Delta \nu_y$ in the J-axis direction are represented by the following equations from FIG. 3C similarly to the case of the X direction:

$$\Delta \mu_y = -T \sin \theta \quad (19)$$

$$\Delta \nu_y = T \cos \theta. \quad (20)$$

A relation between $\mu$ and $\mu^*$ and a relation between $\nu$ and $\nu^*$ for the Cases 1 to 5 are determined, as follows, using $\Delta \mu_x$, $\Delta \nu_x$, $\Delta \mu_y$ and $\Delta \nu_y$. Also, x and y of a recording element A in a screen dot block newly determined can be determined by correcting x and y by the screen pitch T.

(Case 1)

$$\mu = \mu^* - \Delta\mu_x \quad (21)$$

$$\nu = \nu^* - \Delta\nu^* \quad (22)$$

$$x \leftarrow x + T \quad (23)$$

(Case 2)

$$\mu = \mu^* + \Delta\mu_x \quad (24)$$

$$\nu = \nu^* + \Delta\nu^* \quad (25)$$

$$x \leftarrow x - T \quad (26)$$

(Case 3)

$$\mu = \mu^* - \Delta\mu_y \quad (27)$$

$$\nu = \nu^* - \Delta\nu_y \quad (28)$$

$$y \leftarrow y + T \quad (29)$$

(Case 4)

$$\mu = \mu^* + \Delta\mu_y \quad (30)$$

$$\nu = \nu^* + \Delta\nu_y \quad (31)$$

$$y \leftarrow y - T. \quad (32)$$

In the case where the Case 1 or 2 and the Case 3 or 4 are combined, two sets of corresponding displacements may be used. For example, in the combination of the Cases 1 and 3, $\mu$ and $\nu$ are determined by the following equations:

$$\mu = \mu^* - \Delta\mu_x - \Delta\mu_y \quad (33)$$

$$\nu = \nu^* - \Delta\nu_x - \Delta\nu_y \quad (34)$$

(Case 5)

$$\mu = \mu^* \quad (35)$$

$$\nu = \nu^* \quad (36)$$

The threshold value $D(m, n)$ can be determined using the thus determined $(\mu, \nu)$ and the equations (5) to (8). A gray level $p(i, j)$ assigned to the recording element $(i, j)$ is compared with the threshold value $D(m, n)$ to generate a recording signal $S(i, j)$. In the case where $p(i, j)$ is smaller than the threshold value, the recording signal $S(i, j)$ is set to "1" so that the recording element $(i, j)$ is recorded as a part of a screen dot. In the case where $p(i, j)$ is equal to or larger than the threshold value, the recording signal $S(i, j)$ is set to "0". It is of course that "1" and "0" of the recording signal $S(i, j)$ may be inverted. The recording signal $S(i, j)$ can be used as an electric signal directly or can be stored in a memory temporarily.

More detailed description of the present invention will now be made using embodiments.

[Embodiment 1]

Figure 1:
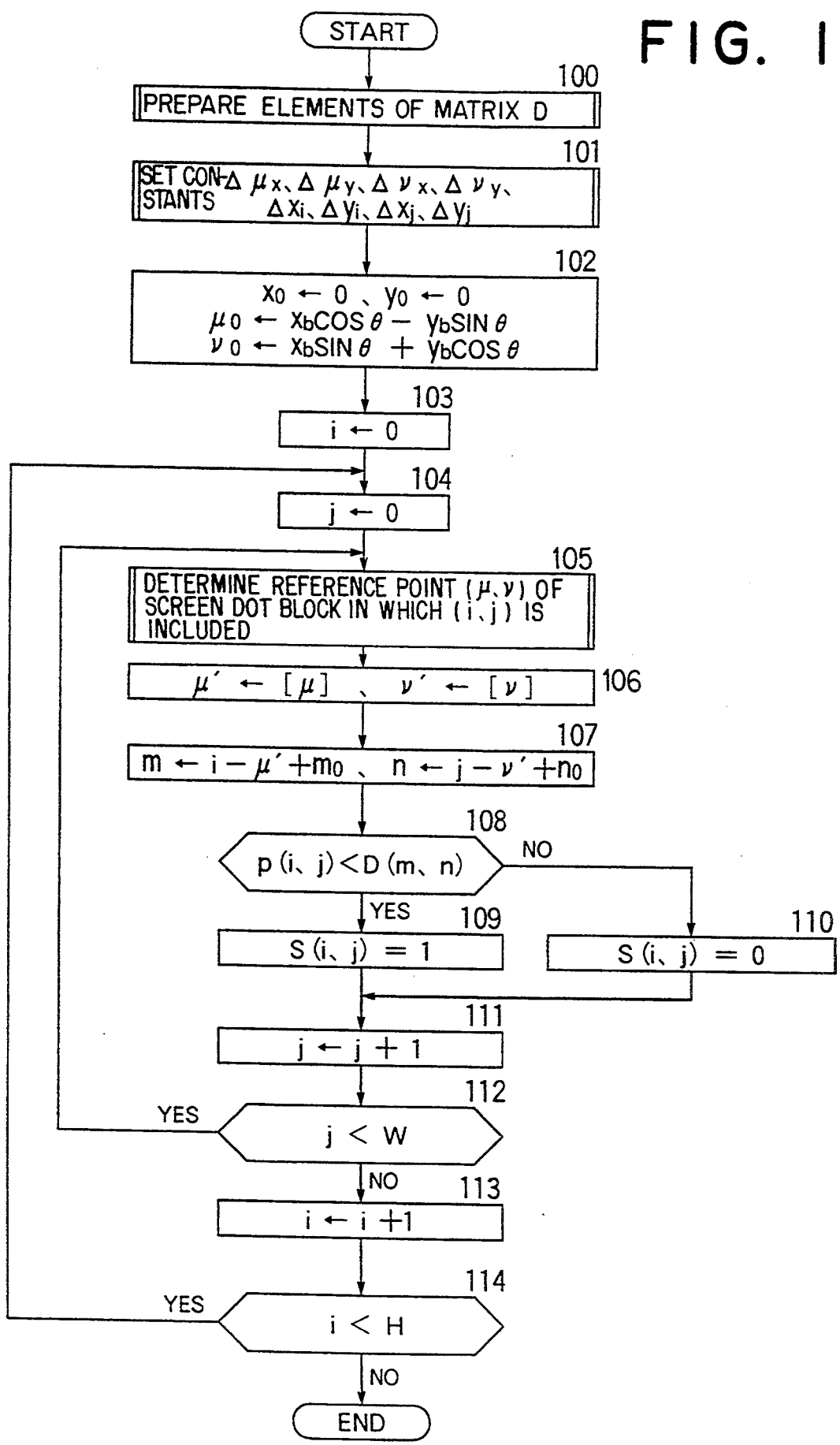
FIG. 1 is a flow chart of a processing in a first embodiment of the present invention.

A first embodiment of the present invention will be explained by use of a flow chart shown in FIG. 1.

First, there is prepared a matrix D of threshold values which is adapted for a screen angle $\theta$ and a screen pitch T (step 100). The size of a recording element is used as the unit of length for the screen pitch T. Therefore, it is necessary to calculate the screen pitch T from the actual length. For example, when recording elements have a density of 2015 dpi and a 175 lpi screen is generated, $$T = 2015/175 = 11.51.$$

The minimum size of the matrix D to completely include one screen dot block is determined from the right side of the relation (1). Using a screen angle $\theta = 15°$ and the above value of T, the right side of the relation (1) is $$[11.51 \times (|\sin 15°| + |\cos 15°|) + 1] = 15.$$

Namely, the size $M \times N$ of the matrix D may be $15 \times 15$. Of course, a larger size can be selected since it is only required to completely include the screen dot block. FIGS. 6A to 6C show this matrix D and examples of a dot generated using the matrix D. An area of one screen dot block (having a size of $T \times T$) is shown by dotted line for comparison with the size of the matrix D. A numeral in each square represents a threshold value which is an element of the matrix D. The threshold values are selected so that a desired form and a desired size of a screen dot can be rendered. Generally or in many cases, a gray level is represented by an integer of eight bits. Supposing such a representation, threshold values of 0 to 255 are used as elements of the matrix D in the present embodiment. In the case where the relative position of the reference point of the screen dot block shown in FIG. 5B is $x_b = 4.5$ and $y_b = 4.3$ and the minimum matrix size is selected, $m_o = 7$ and $n_o = 6$ from the equations (2') and (3'). Of course, any values can be selected for $x_b$ and $y_b$ so long as they are within the range between 0 and T. A square enclosed by a thick line in FIG. 6 represents a reference element $D(m_o, n_o)$ of the matrix D thus determined. A shaded portion represents a generated screen dot, that is, an assembly of points of $S(i, j) = 1$. FIGS. 6A, 6B and 6C show screen dots having gray levels which are 25 (or 26), 57 (or 58) and 115 (or 116), respectively.

Next, the setting of constants and the initialization of variables are performed (step 101). Constants $\Delta x_i$, $\Delta y_i$, $\Delta x_j$, $\Delta y_j$, $\Delta\mu_x$, $\Delta\nu_x$, $\Delta\mu_y$ and $\Delta\nu_y$ are determined from the equations (9), (10), (13), (14), (17), (18), (19) and (20), respectively. Initial values $x_o$ and $y_o$ represent x and y of a recording element (0, 0) and are both 0. Also, initial values $\mu_o$ and $\nu_o$ are the coordinate of a reference point of a screen dot block including the recording element (0, 0) and are determined by use of $x_b$ and $y_b$ from the following equations:

$$\mu_o = x_b \cos\theta - y_b \sin\theta$$

$$\nu_o = x_b \sin\theta + y_b \cos\theta.$$

In order to generate recording signals for all of recording elements, the following steps are repeated for i from 0 to the total number H of recording elements in the I-axis direction and j from 0 to the total number W of recoding elements in the J-axis direction.

First, a reference point $(\mu, \nu)$ of a screen dot block including a recording element (i, j) is determined (step 105). More particularly, the judgement of the above-mentioned Cases 1 to 5 is made on the basis of the values of x and y of the recording element (i, j), and the calculation of the reference point $(\mu, \nu)$ and the correction of x, y are performed in accordance with the equations (21) to (36). It is not necessary to store $\mu$, $\nu$, x and y for all the recording elements (i, j). Since mere reference to the immediately preceding recording element (i, j−1) suffices, each of $\mu$, $\nu$, x and y can successively be updated using one variable. At j=0, however, another variable is necessary since reference is made to a recording element (i−1, 0). Thus, $\mu$, $\nu$, x and y are used for j≧1, and $\mu_o$, $\nu_o$, $x_o$ and $y_o$ are used for j=0.

Figure 2:
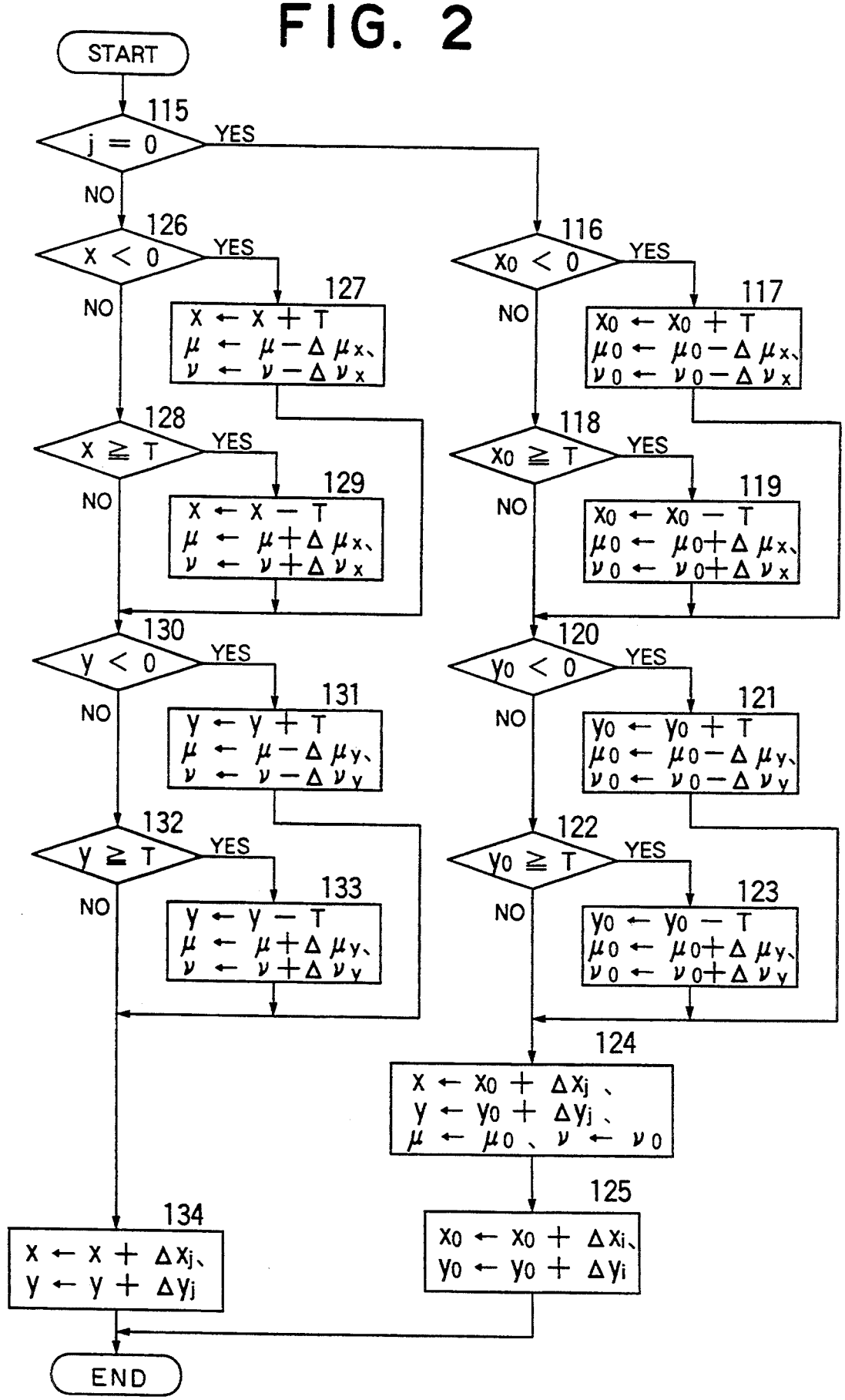
FIG. 2 is a flow chart of a processing for determining a center coordinates of a reference point ($\mu$, $\nu$) of a screen dot block in which a recording element (i, j) in FIG. 1 is included.

A detailed flow chart of step 105 is shown in FIG. 2. First, the judgement is made as to whether or not j=0 (step 115). In the case where j=0, the judgement of the Cases 1 to 5 is made by use of $x_o$ and $y_o$ in conjunction with a positional relationship between a screen dot block in which a recording element (i−1, 0) is included and a screen dot block in which a recording element (i, 0) is included.

First, the judgement is made as to whether or not $x_o$ is smaller than 0 (step 116). The case, where $x_o$ is smaller than 0, corresponds to the Case 1. In this case, $\mu_o$, $\nu_o$, $x_o$ and $y_o$ are updated in accordance with the equations (21) to (23) (step 117). Thereafter, the flow proceeds to the judgement for $y_o$.

When $x_o$ is not smaller than 0 (step 116), the judgement is made as to whether or not $x_o$ is not smaller than T (step 118). The case, where $x_o$ is not smaller than T, corresponds to the Case 2. In this case, $\mu_o$, $\nu_o$, $x_o$ and $y_o$ are updated in accordance with the equations (24) to (26) (step 119).

Next, the judgement is made as to whether or not $y_o$ is smaller than 0 (step 120). The case, where $y_o$ is smaller than 0, corresponds to the Case 3. In this case, $\mu_o$, $\nu_o$, $x_o$ and $y_o$ are updated in accordance with the equations (27) to (29) (step 121). And, the judgement is finished.

When $y_o$ is not smaller than 0 (step 120), the judgement is made as to whether or not $y_o$ is not smaller than T (step 122). The case, where $y_o$ is not smaller than T, corresponds to the Case 4. In this case, $\mu_o$, $\nu_o$, $x_o$ and $y_o$ are updated in accordance with the equations (30) to (32) (step 123).

The judgement of the Cases 1 to 5 is completed by the above, and x, y, $\mu$ and $\nu$ are respectively changed to $x_o + \Delta x_j$ (in accordance with the equation (15)), $y_o + \Delta y_j$ (in accordance with the equation (16)), $\mu_o$ and $\nu_o$ to prepare for the next recording element (i, 1) (step 124). Further, $\Delta x_i$ and $\Delta y_i$ are respectively added to $x_o$ and $y_o$ (in accordance with the equations (11) and (12)) to prepare for a recording element (i+1, 0) for the next scan (step 125). Thereby, the reference point determining step 105 in the case of j=0 is completed.

In the case where j≠0 is determined in step 115, a similar judgement as to the positional relationship between the screen dot block including the recording element (i, j−1) and the screen dot including the recording element (i, j) is made with $\mu_o$, $\nu_o$, $x_o$ and $y_o$ in steps 116 to 123 being replaced by $\mu$, $\nu$, x and y, respectively (steps 126 to 133).

After the completion of the judgement, $\Delta x_j$ and $\Delta y_j$ are respectively added to x and y in accordance with the equations (15) and (16) to prepare for the next recording element (i, j+1) (step 134), thereby completing the reference point determining step 105.

By the foregoing, the reference point ($\mu$, $\nu$) of the screen dot block including the recording element (i, j) has been determined. The explanation will be continued returning to the flow chart shown in FIG. 1. A threshold value for determining whether or not the recording element (i, j) is to be recorded, is selected from among elements of the prepared matrix D. First, $\mu$ and $\nu$ are converted into integers in accordance with the equations (5) and (6) to obtain $\mu'$ and $\nu'$ (step 106). Next, the equations (7) and (8) are used to determine m and n of a threshold value D(m, n) which is a matrix element to be selected (step 107).

Finally, the selected threshold value D(m, n) and a gray level p(i, j) assigned to the recording element (i, j) are compared (step 108). In the case where the gray level is smaller than the threshold value, the recording signal S(i, j) for the recording element (i, j) is set to "1" (step 109). In the case where the gray level is not smaller than the threshold value, S(i, j) is set to "0" (step 110).

The construction of a system used in the present embodiment is shown in FIG. 10. Three primary color signals are read from a colored original by a color scanner 10. The signals are converted into image signals for color separations "magenta", "cyan", "yellow" and "black" on a workstation 11 by use of a known technique. The image signals may be produced by another system. In this case, the signals are taken into the workstation 11 through a magnetic medium or a network. The image signals are stored into an auxiliary storage 12 in order to use them as the gray levels p(i, j) in step 108 of FIG. 1. While performing the processing shown in FIG. 1 by the workstation 11, the recording signal S(i, j) is successively stored into a buffer memory 13. The content of the buffer memory 13 is transferred to a laser scanning output recorder 15 through an interface 14. The laser scanning output recorder 15 turns on and off a laser in accordance with the transferred recording signal S(i, j). The whole of a recording medium is scanned for exposure to obtain color separations. The essential point of the present invention lies in the acquisition of the recording signal S(i, j) from the gray level p(i, j) of the image signal. Therefore, the present invention is not limited to the system construction.

Figure 7:
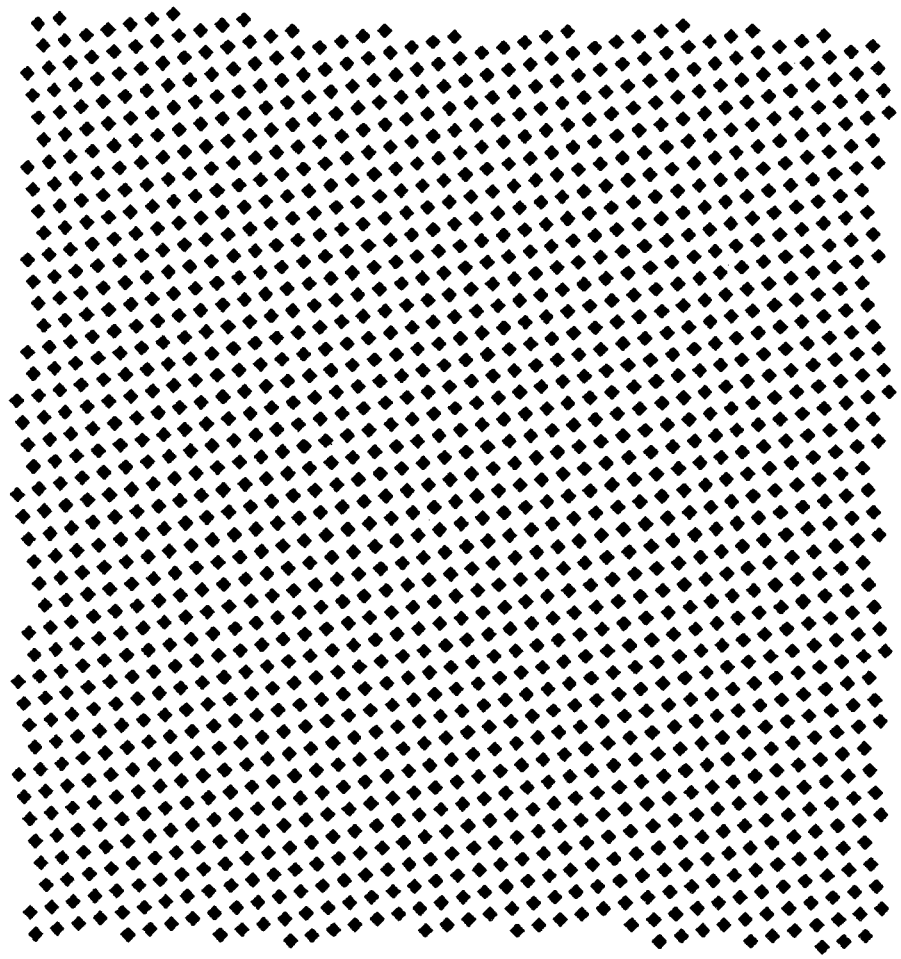
FIG. 7 is a diagram showing screen dots with a screen angle of 15 and a screen percentage of about 10% produced by a method of the present invention.

FIG. 7 shows an example in which a screen dot image was actually produced by the above method. In FIG. 7, there is produced a screen dot image with a screen angle $\theta$ of 15° and a constant screen percentage of about 10% in which each screen dot corresponds to the screen dot shown in FIG. 6A. There is produced a screen dot image which has a screen angle and a screen pitch, as expected, and in which each screen dot has the same form.

[Embodiment 2]

From the classification into the Cases 1 to 4, it is seen that the sign of $\Delta x_j$ (or $\Delta y_j$) determines whether the screen dot block including the recording element (i, j) is adjacent to the screen dot block including the recording element (i, j−1) in the negative direction or the positive direction of the X axis (or Y axis). For example, if $\Delta x_j > 0$ (or $\Delta y_j > 0$), there exists only the case where the former block is adjacent to the latter block in the positive direction of the X axis (or Y axis). Since the sign of $\Delta x_j$ (or $\Delta y_j$) is determined by the screen angle $\theta$, only the judgement of the Case 2 (or Case 4) suffices and the judgement of the Case 1 (or Case 3) or step 126 (or step 130) in FIG. 2 is unnecessary. The same holds (in conjunction with the flow in FIG. 2 in the case of j=0) for a relationship between the recording element (i, j) and the recording element (i−1, j) which is determined by the signs of $\Delta x_i$ and $\Delta y_i$. Accordingly, if the Cases 1 and 2 or the Cases 3 and 4 can be processed collectively, the process can be simplified.

For that purpose, x and y are redefined as being a component of a vector from the center point of a screen dot block toward a recording element in the X direction and a component thereof in the Y direction, respectively. Then, since each of $x_o$, $y_o$, x and y takes values in a range between $-T/2$ and $T/2$, the judgement of the Cases 1 to 4 can be made by judging whether or not the absolute value of $x_o$, $y_o$, x or y exceeds $T/2$.

Also, in updating the value of the variable $\mu_o$, $\nu_o$, $x_o$, $y_o$, $\mu$, $\nu$, x or y, the sign of $\Delta x_i$, $\Delta y_i$, $\Delta x_j$ or $\Delta y_j$ determines whether the constant T, $\Delta\mu_x$, $\Delta\nu_x$, $\Delta\mu_y$ or $\Delta\nu_y$ should be added or subtracted. Thus, the constant T, $\Delta\mu_x$, $\Delta\nu_x$, $\Delta\mu_y$ and $\Delta\nu_y$ are changed as follow:

$Tx_i = -\text{sgn}(\Delta x_i) \times T$ (in lieu of T in step 117 and $-T$ in step 119), $Ty_i = -\text{sgn}(\Delta y_i) \times T$ (in lieu of T in step 121 and $-T$ in step 123), $Ty_j = -\text{sgn}(\Delta x_j) \times T$ (in lieu of T in step 127 and $-T$ in step 129), $Ty_j = -\text{sgn}(\Delta y_j) \times T$ (in lieu of T in step 131 and $-T$ in step 133), $\Delta\mu_{xi} = \text{sgn}(\Delta x_i) \times \Delta\mu_x$ (in lieu of $-\Delta\mu_x$ in step 117 and $\Delta\mu_x$ in step 119), $\Delta\nu_{xi} = \text{sgn}(\Delta x_i) \times \Delta\nu_x$ (in lieu of $-\Delta\nu_x$ in step 117 and $\Delta\nu_x$ in step 119), $\Delta\mu_{yi} = \text{sgn}(\Delta y_i) \times \Delta\mu_y$ (in lieu of $-\Delta\mu_y$ in step 121 and $\Delta\mu_y$ in step 123), $\Delta\nu_{yi} = \text{sgn}(\Delta y_i) \times \Delta\nu_y$ (in lieu of $-\Delta\nu_y$ in step 121 and $\Delta\nu_y$ in step 123), $\Delta\mu_{xj} = \text{sgn}(\Delta x_j) \times \Delta\mu_x$ (in lieu of $-\Delta\mu_x$ in step 127 and $\Delta\mu_x$ in step 129), $\Delta\nu_{xj} = \text{sgn}(\Delta x_j) \times \Delta\nu_x$ (in lieu of $-\Delta\nu_x$ in step 127 and $\Delta\nu_x$ in step 129), $\Delta\mu_{yj} = \text{sgn}(\Delta y_j) \times \Delta\mu_y$ (in lieu of $-\Delta\mu_y$ in step 131 and $\Delta\mu_y$ in step 133), and $\Delta\nu_{yj} = \text{sgn}(\Delta y_j) \times \Delta\nu_y$ (in lieu of $-\Delta\nu_y$ in step 131 and $\Delta\nu_y$ in step 133).

The values of the variables $\mu_o$, $\nu_o$, $x_o$, $y_o$, $\mu$, $\nu$, x and y can be updated by adding the above constants. Herein, sgn(z) is a function defined as follows:

$$\text{sgn}(z) = \begin{cases} 1 & (z > 0) \\ 0 & (z = 0) \\ -1 & (z < 0) \end{cases}$$

Figure 8:
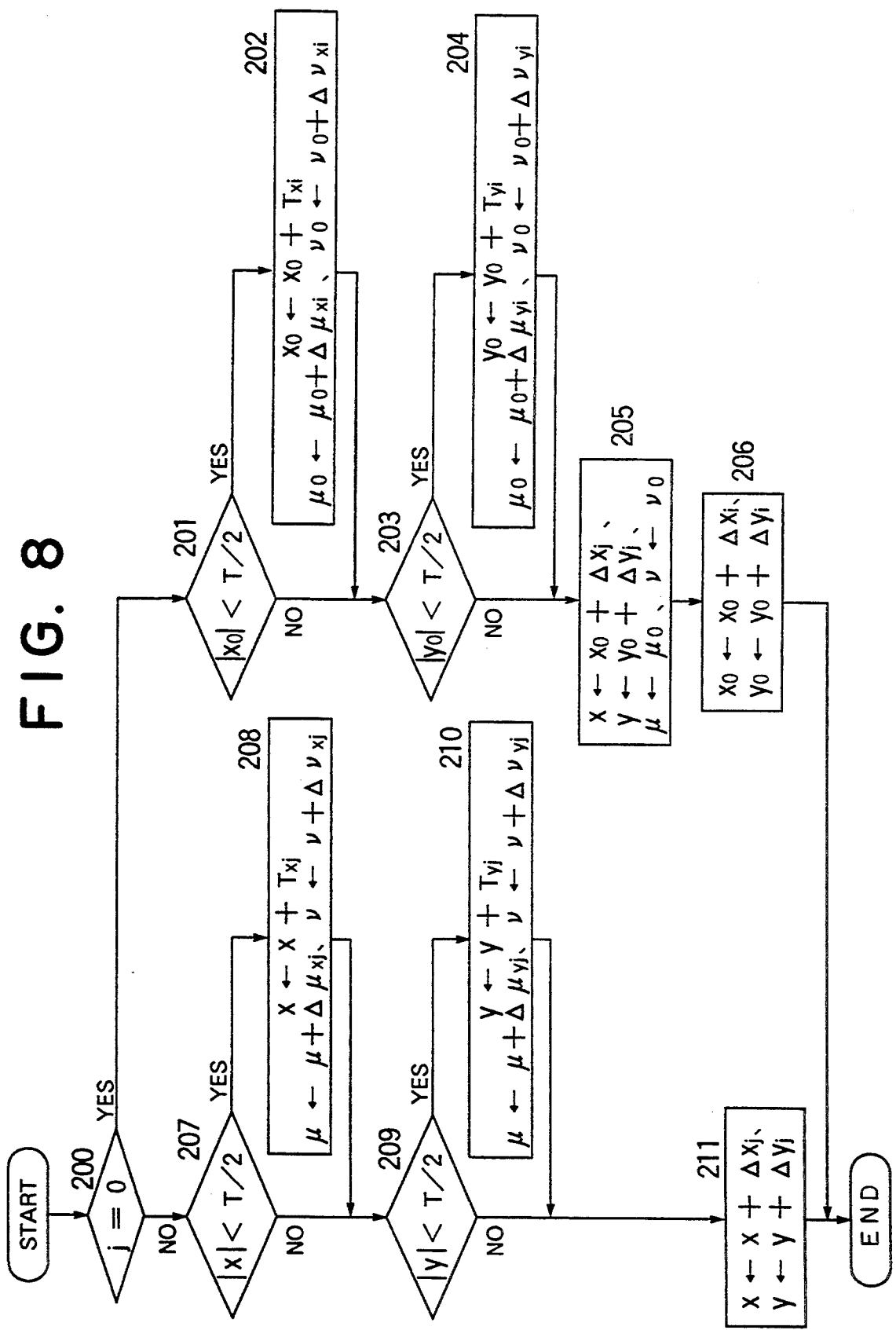
FIG. 8 is a flow chart of a processing in a second embodiment of the present invention in which the center coordinates of the reference point ($\mu$, $\nu$) of the screen dot block including the recording element (i, j) shown in FIG. 2 is simplified.

By the above procedure, the Cases 1 and 2 and the Cases 3 and 4 can be judged collectively and the reference point $(\mu, \nu)$ of the screen dot block including the recording element (i, j) can be determined using a method along a flow chart shown in FIG. 8 in lieu of the flow chart shown in FIG. 2. Though not shown, the above constants should be set further in step 101 in FIG. 1.

Thus, steps 115 to 134 in FIG. 2 can be simplified as steps 200 to 211 in FIG. 8. Namely, steps 116, 117, 126 and 127 in FIG. 2 corresponding to the Case 1 and steps 118, 119, 128 and 129 in FIG. 2 corresponding to the Case 2 are collected into steps 201, 202, 207 and 208 in FIG. 8. Also, steps 120, 121, 130 and 131 in FIG. 2 corresponding to the Case 3 and steps 122, 123, 132 and 133 in FIG. 2 corresponding to the Case 4 are collected into steps 203, 204, 209 and 210 in FIG. 8.

The same result as that of FIG. 7 is obtained by the present embodiment, too.

[Embodiment 3]

In the first and second embodiments, steps 106 and 107 have been carried out for all the recording elements (i, j) in order to determine the matrix element D(m, n) to be compared with the gray level p(i, j). However, in the Case 5 where the recording element (i, j) and the recording element (i, j − 1) are included in the same screen dot block, the matrix element D(m, n) can be determined in a further simple manner as follows.

Since the recording element (i, j) is included in the screen dot block which includes the recording element (i, j − 1), an element of the matrix to be compared with the gray level p(i, j) is D(m, n), provided that an element of the matrix to be compared with a gray level p(i, j − 1) is D(m, n − 1). Accordingly, in the case where the examination of the values of x and y results in that the recording element (i, j) and the recording element (i, j − 1) are included in the same screen dot block, the mere addition of 1 to the value of n with the value of m unchanged is required with no need of determining m and n in accordance with the equations (7) and (8).

Figure 9A:
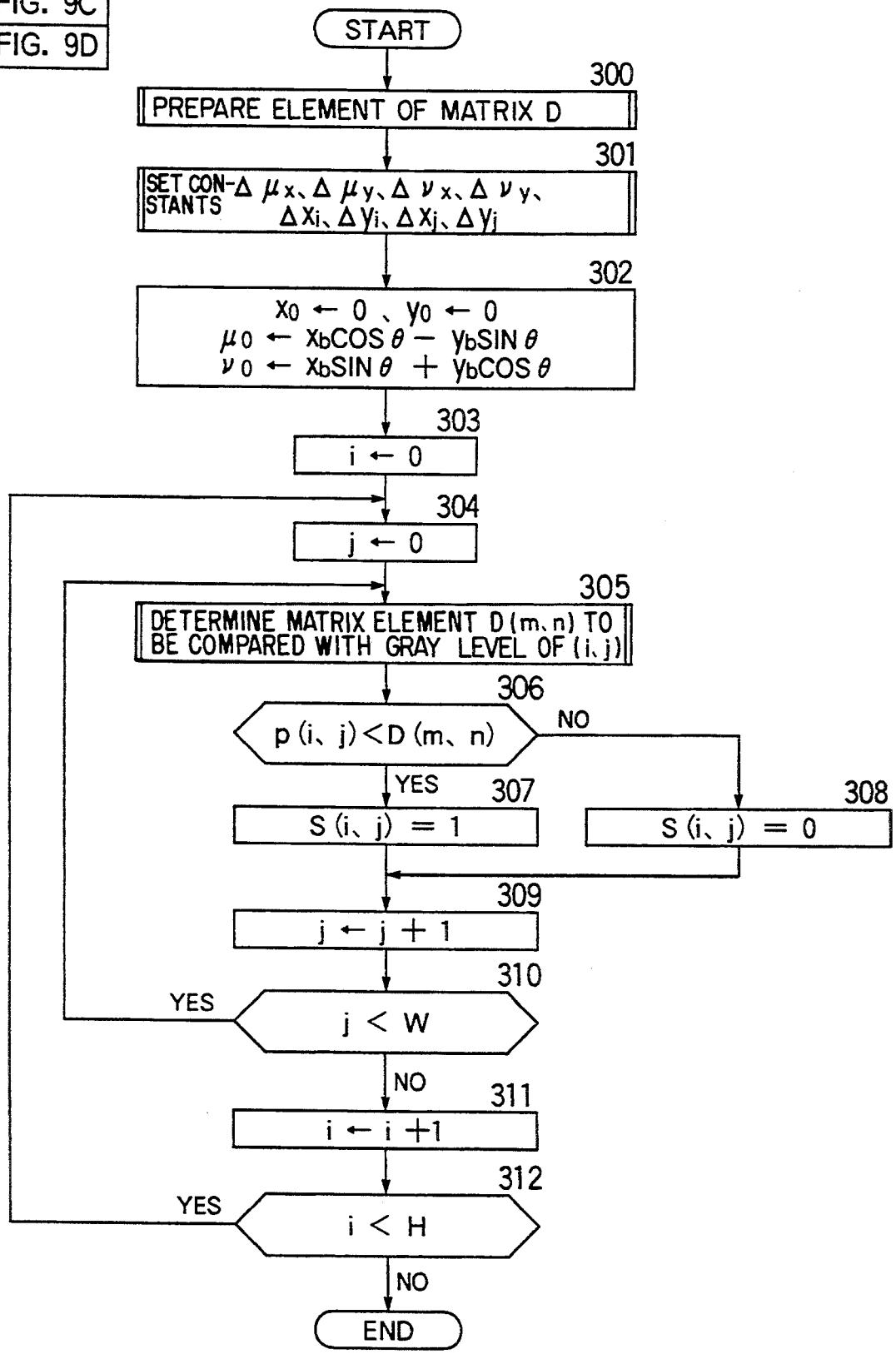
Figure 9B:
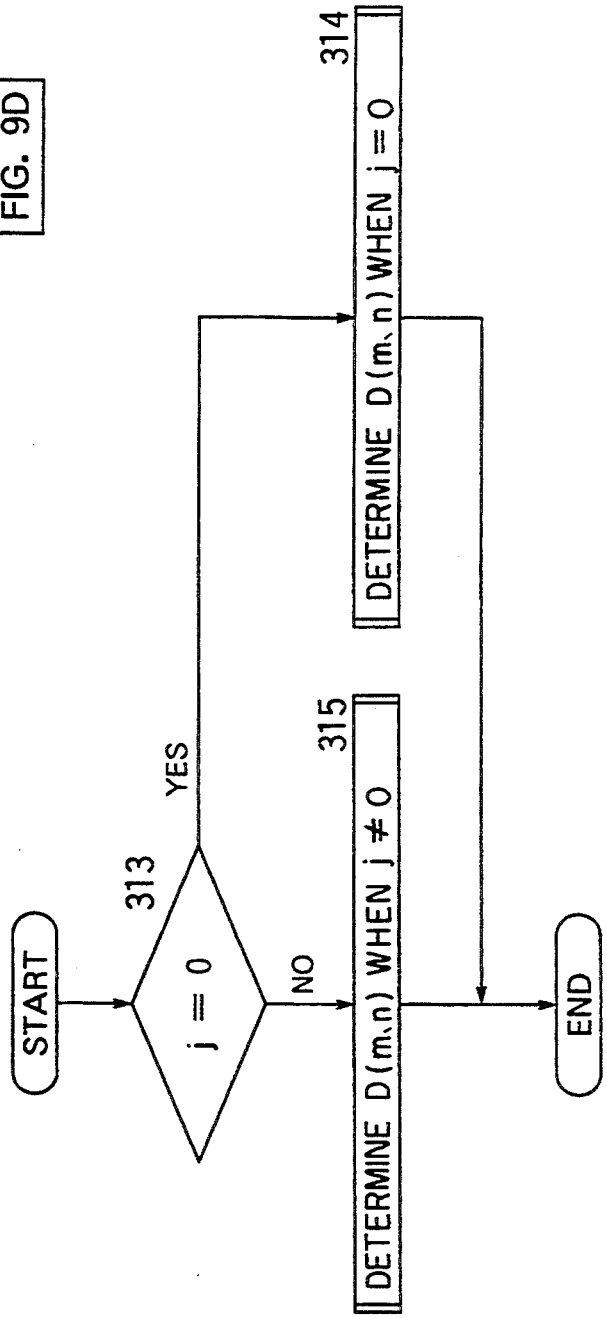
Figure 9C:
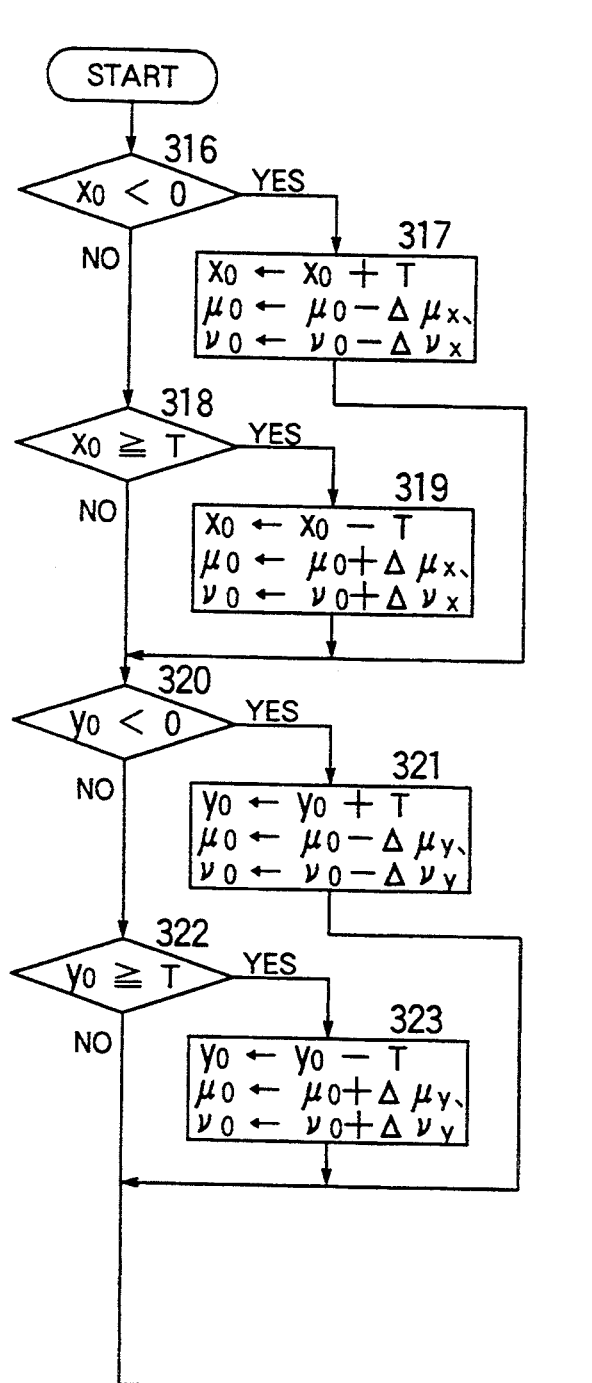
Figure 9C:
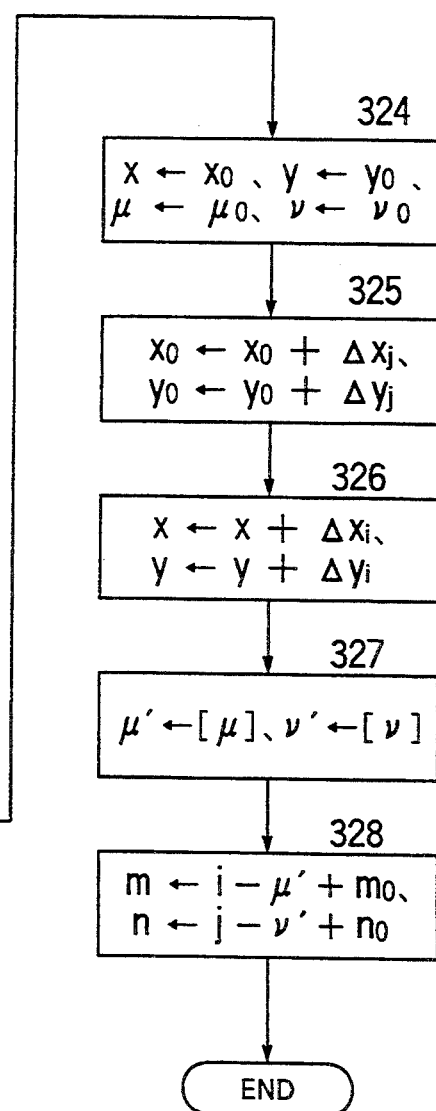

The above is illustrated by flow charts shown in FIGS. 9A to 9D. FIG. 9A shows the flow of the whole and steps 105 to 107 in FIG. 1 are collected by step 305 in FIG. 9A. FIG. 9B shows the details of step 305. In the case where j=0 in step 313, step 314 is carried out. The details of step 314 are shown in FIG. 9C. In this case, since a relationship between the recording element (i, j) and a recording element (i−1, j) is examined, the above-mentioned method cannot be applied. Therefore, the method in the first embodiment is used. Namely, steps 316 to 328 in FIG. 9C perform steps 116 to 125 in FIG. 2 and steps 106 and 107 in FIG. 1.

Figure 9D:
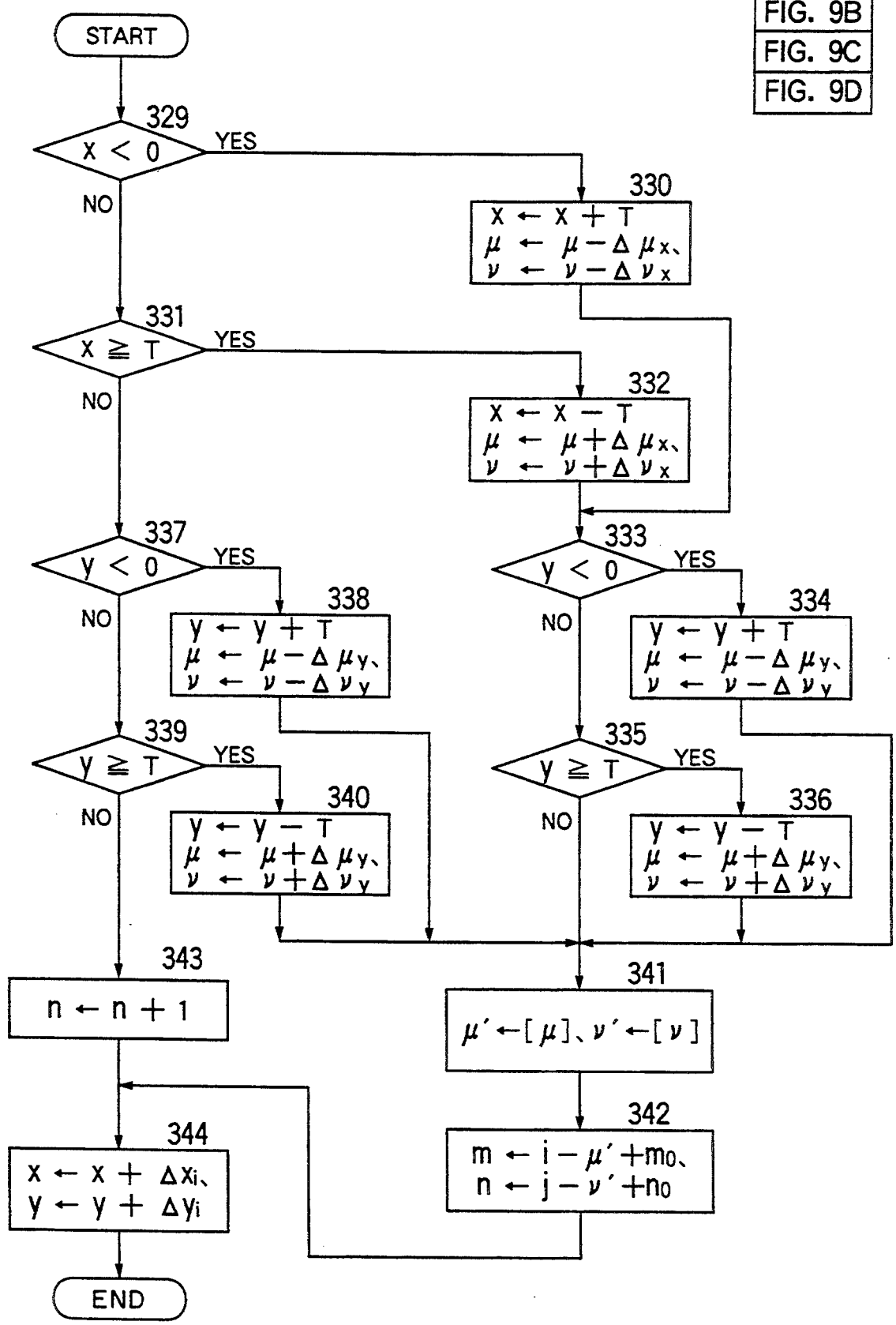

In the case where j≠0 in step 313, the above-mentioned method is applied in step 315. The details of step 315 are shown in FIG. 9D. The case, where either one of the conditional judgements in steps 329, 331, 333, 335, 337 and 339 shows an affirmative determination, corresponds to either one of the Cases 1 to 4. In this case, steps 106 and 107 in FIG. 1 are performed in steps 341 and 342 in FIG. 9D.

The case, where all the conditional judgements in steps 329, 331, 337 and 339 show a negative determination, corresponds to the Case 5. In this case, the above-mentioned method is applied. This is step 343. Now estimate the proportion of recording elements subjected to step 343 to all the recording elements. The number of recording elements included in one screen dot block is approximately $T \times T$. The number of recording elements corresponding to the Cases 1 to 4 is approximately $2 \times T$ since those elements lie on two sides of the screen dot block. Since the other corresponds to the Case 5, the number of recording elements corresponding to the Case 5 is $T \times T - 2 \times T$. Accordingly, the proportion to be estimated is $1-2/T$. For example, when T is 11.51, the above-mentioned method can be applied for about 80% of recording elements. As a result, the present embodiment is very effective for the shortening of an operating time.

In the present embodiment, the above-mentioned method has been applied to the first embodiment. It is of course that the above method can also be applied to the second embodiment. The same result as that of FIG. 7 is obtained by the present embodiment, too.

We claim:

1. A screen dot image recording method in which gray levels are assigned to recording elements arranged in a first coordinate system, said recording elements corresponding to minimum recording units of an image recording system and obtained from a half-tone original, said recording elements being compared with threshold values for determining whether or not said recording elements are to be recorded as constituent elements of screen dots, are compared to record for recording said screen dots in a direction of said first coordinate system in which recording directions of said image recording system are taken as coordinate axes, and a size of said recording elements being taken as a unit of said first coordinate system, thereby rendering said half tone of said original, said method comprising the steps of:

preparing a plurality of screen dot blocks arranged within a grid region in a second coordinate system, said screen dot blocks being repeated at a first period and inclined at a screen angle with respect to said first coordinate system and covering said half-tone original, each of said screen dot blocks including one reference point defined therein at an identical fixed point in each screen dot block;

preparing a matrix having threshold values as matrix elements, said matrix being located in said direction of said first coordinate system, said matrix having a size so as to include therein an entire one of said screen dot blocks arranged in said second coordinate system when said matrix elements are superimposed on said plurality of screen dot blocks with rows and columns of said matrix being directed parallel to said first coordinate system, and said matrix having a reference element which is superimposed on a recording element including said one reference point defined in said screen dot block;

determining a coordinate of said reference point of a screen dot block in which a current recording element is included based on a coordinate of said current recording element;

converting said coordinate of said reference point into an integer;

selecting one of said matrix elements of said matrix as a threshold value to be compared with a gray level assigned to said current recording element included in said screen dot block, a position of said matrix element relative to said matrix reference element being the same as a position of said current recording element relative to a recording element which has a coordinate value of said integer; and comparing said gray level of said current recording element and said threshold value to determine whether or not said current recording element is to be recorded.

2. A screen dot image recording method according to claim 1, wherein a second reference point of a second screen dot block including another recording element adjacent to said current recording element is used in said screen dot image recording method, said reference point of the said first screen dot block including said current recording element, which is adjacent to said another recording element, is determined by the steps of:

adding a component of projection of one recording element projected in said inclined direction to a relative position of said another recording element in the second screen dot block, said second screen dot block corresponding to said first screen dot block or a screen dot block adjacent to said first dot block, to obtain a relative position of said current recording element in the second screen dot block, said relative position being represented by said inclined direction component of projection of a vector toward said current recording element from one point, the relative position of which is fixed in all of said screen dot blocks; and taking as a coordinate value of the reference point of the first screen dot block, a coordinate value of a reference point of said second screen dot block if said relative position of said current recording element in said second screen dot block is within a range determined by said period, otherwise said coordinate value is obtained by adding a displacement of one screen dot block in said second coordinate system, which is determined by said screen angle and said period, to said coordinate value of said reference point of said second screen dot block.

* * * * *